(12) United States Patent
Fayazbakhsh et al.

(10) Patent No.: US 11,581,974 B1
(45) Date of Patent: Feb. 14, 2023

(54) TECHNIQUES FOR USING REFLECTING NODES TO CANCEL INTERFERING SIGNALS IN WIRELESS COMMUNICATIONS

(71) Applicant: QUALCOMM Incorporated, San Diego, CA (US)

(72) Inventors: Farideddin Fayazbakhsh, Chatham, NJ (US); Raju Hormis, New York, NY (US); Junyi Li, Fairless Hills, PA (US); Navid Abedini, Basking Ridge, NJ (US); Danlu Zhang, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 17/384,300

(22) Filed: Jul. 23, 2021

(51) Int. Cl.
*H04K 3/00* (2006.01)

(52) U.S. Cl.
CPC ..................................... *H04K 3/20* (2013.01)

(58) Field of Classification Search
CPC ............... H04K 3/20; H04K 3/22; H04K 3/00
See application file for complete search history.

(56) References Cited

U.S. PATENT DOCUMENTS

2011/0039496 A1   2/2011  Chueh et al.
2021/0083758 A1   3/2021  Tarighat Mehrabani

FOREIGN PATENT DOCUMENTS

EP           905914 A2 *   3/1999   ............. H04B 1/126

OTHER PUBLICATIONS

International Search Report and Written Opinion—PCT/US2022/072488—ISA/EPO—dated Aug. 29, 2022.
Qun W., et al., "Energy Efficient Robust Beam Forming and Cooperative Jamming Design for IRS-Assisted MISO Networks", IEEE Transactions on Wireless Communications, IEEE Service Center, Piscataway, NJ, US, vol. 20, No. 4, Dec. 15, 2020 (Dec. 15, 2020), pp. 2592-2607, XP011848716, [retrieved on Apr. 8, 2021], Sections II, III.

* cited by examiner

*Primary Examiner* — Keith Ferguson
(74) *Attorney, Agent, or Firm* — ArentFox Schiff LLP

(57) ABSTRACT

Aspects described herein relate to identifying an aggressor node that transmits interfering signals that cause interference to signals received at the node, communicating a configuration for applying a phase shift to the interfering signals for forwarding to the node from a reflecting node with the phase shift applied, and communicating, from the reflecting node, the interfering signals with the phase shift applied to at least partially cancel the interference to the signals received at the node.

30 Claims, 13 Drawing Sheets

TECHNIQUES FOR USING REFLECTING NODES TO CANCEL INTERFERING SIGNALS IN WIRELESS COMMUNICATIONS

BACKGROUND

Aspects of the present disclosure relate generally to wireless communication systems, and more particularly, to using reflecting nodes to reflect wireless signals.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

Some wireless communication technologies, such as 5G NR, can allow for using reflecting nodes to reflect communications from base stations to improve signal range and hearability.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a transceiver, a memory configured to store instructions, and one or more processors communicatively coupled with the memory and the transceiver. The one or more processors are configured to execute the instructions to cause the apparatus to identify an aggressor node that transmits interfering signals that cause interference to signals received at the node, transmit a configuration for applying a phase shift to the interfering signals for forwarding to the node from a reflecting node with the phase shift applied, and receive, from the reflecting node, the interfering signals with the phase shift applied to at least partially cancel the interference to the signals received at the node.

In another aspect, an apparatus for wireless communication is provided that includes a transceiver, a memory configured to store instructions, and one or more processors communicatively coupled with the memory and the transceiver. The one or more processors are configured to execute the instructions to cause the apparatus to receive a configuration for applying a phase shift to interfering signals received from an aggressor node for forwarding to a node from a reflecting node with the phase shift applied, receive, from the aggressor node, the interfering signals, apply, based on the configuration, the phase shift to the interfering signals, and transmit, to the node, the interfering signals with the phase shift applied.

In another aspect, a method for wireless communication by an intended receiving node is provided that includes identifying an aggressor node that transmits interfering signals that cause interference to signals received at the node, transmitting a configuration for applying a phase shift to the interfering signals for forwarding to the node from a reflecting node with the phase shift applied, and receiving, from the reflecting node, the interfering signals with the phase shift applied to at least partially cancel the interference to the signals received at the node.

In another aspect, a method for wireless communication by a reflecting node is provided that includes receiving a configuration for applying a phase shift to interfering signals received from an aggressor node for forwarding to a node from a reflecting node with the phase shift applied, receiving, from the aggressor node, the interfering signals, applying, based on the configuration, the phase shift to the interfering signals, and transmitting, to the node, the interfering signals with the phase shift applied.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
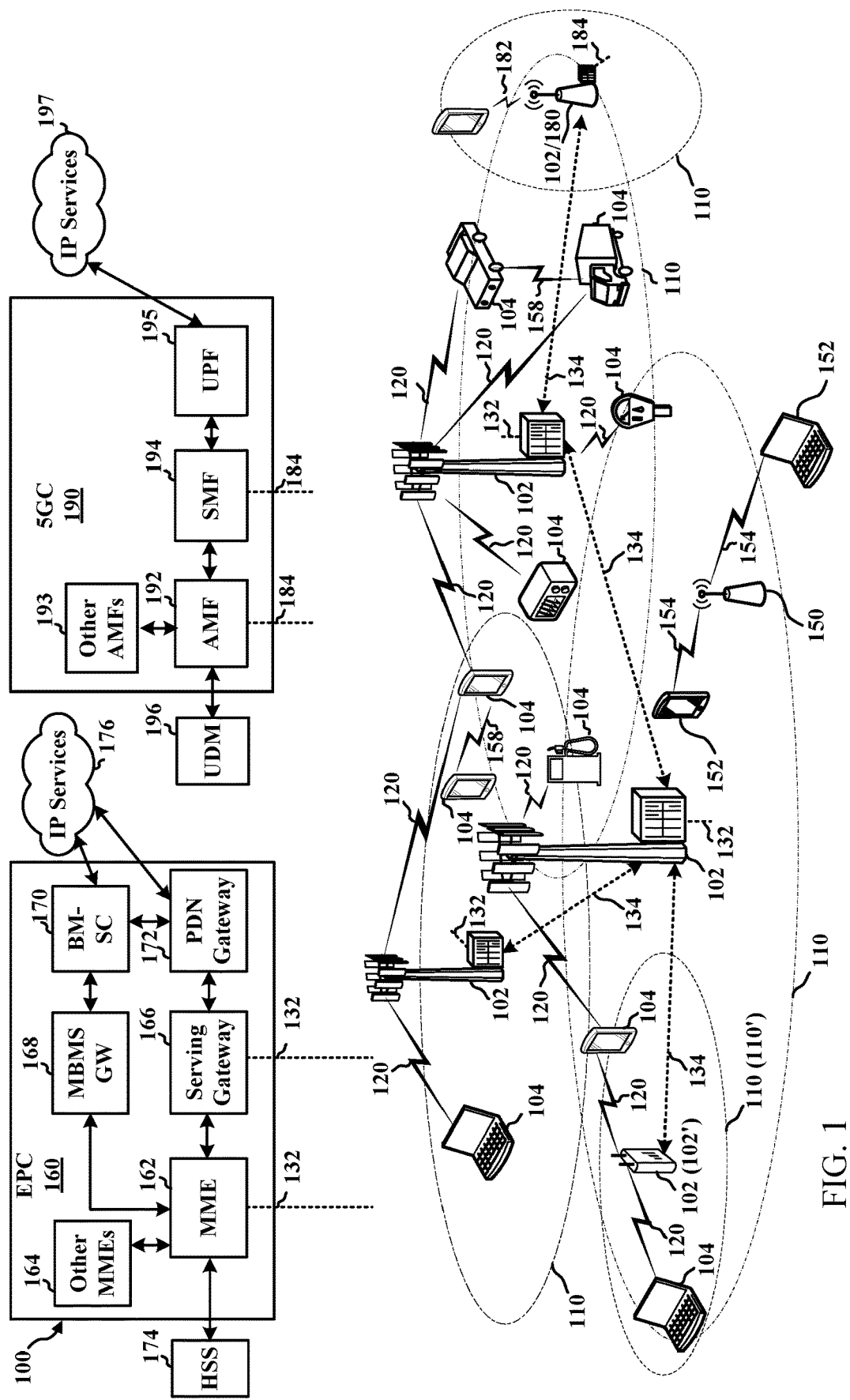
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to using a reflecting node in wireless communications to send signals that at least partially cancel interfering signals received from aggressor nodes. In an example, an intended receiver node can detect interfering signals received from the aggressor node and can configure a reflecting node or the aggressor node such that the intended receiver can also receive a phase shifted version of the interfering signal from the reflecting node, which can cause at least partial cancellation of the interfering signal at the intended receiver node. For example, the intended receiver node can be a base station, user equipment (UE), or other node, and the aggressor node can be a base station, UE, or another node, that sends, or reflects, a jamming signal that can be observed and determined to cause interference at the intended receiver node. The reflecting node can be a configurable reflecting surface (e.g., an intelligent reflecting surface (IRS), reconfigurable intelligent surface (RIS), etc.), a repeater (e.g., with or without components to digitize, amplify, etc. received signals for transmission), and/or the like.

In an example, the reflecting node can be configured to transmit the interfering signal with a phase shift applied to at least partially cancel the interfering signal at the intended receiving node, where the phase shift can be a pi-phase shift (e.g., 180 degree shift in amplitude). In this regard, the two received signals can interact destructively to effectively minimize or cancel the jamming from the interfering signal at the intended receiving node. In addition, a direction of the reflecting node and/or other transmitting parameters (e.g., transmit power) can be configured to improve cancelation of the interfering signals. This can be used to cancel substantially any interference, which may include the intended receiving node's own transmitted signals (e.g., as received on its receiver after propagation when operating in full duplex). In addition, unlike filtering approaches, which may not be able to cancel in-channel jamming, using a reflecting node in this regard can cancel in-band or in-channel jamming. Canceling interfering signals using the reflecting node can provide an efficient mechanism for canceling the interfering signals without requiring extra signal processing at the intended receiving node. In this regard, wireless communications can be improved at the intended receiving node by improving signal quality due to canceled interference, which can also improve communication throughput.

The described features will be presented in more detail below with reference to FIGS. 1-13.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Turning now to FIGS. 2-13, aspects are depicted with reference to one or more components and one or more methods that may perform the actions or operations described herein, where aspects in dashed line may be optional. Although the operations described below in FIGS. 6-9 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Figure 2:
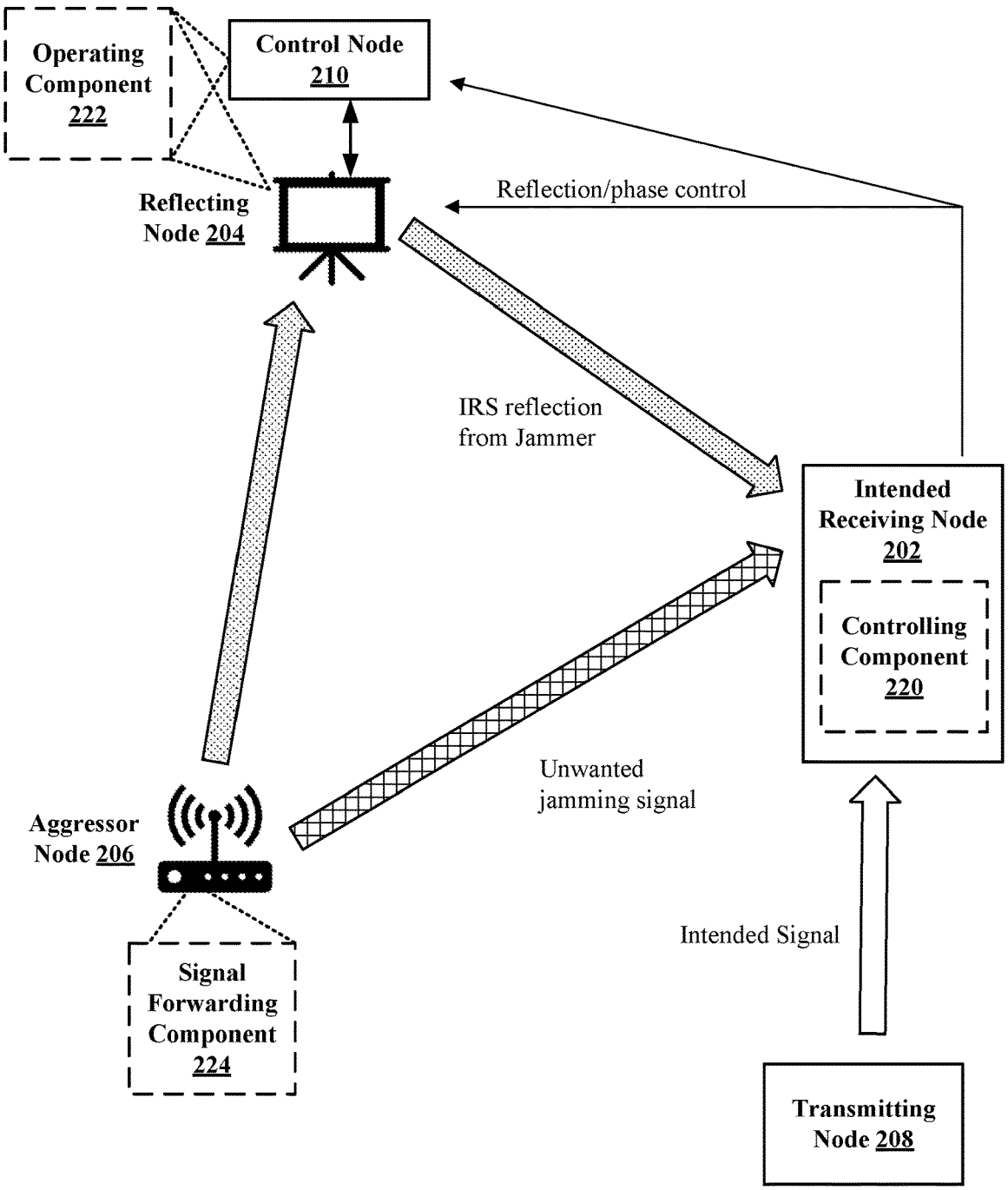
FIG. 2 illustrates an example of a wireless communication system for reflecting modified interfering signals to an intended receiving node to allow for at least partial cancellation of the interfering signals at the intended receiving node, in accordance with various aspects of the present disclosure.

FIG. 2 illustrates an example of a wireless communication system 200 for reflecting modified interfering signals to an intended receiving node 202 to allow for at least partial cancellation of the interfering signals at the intended receiving node 202. Wireless communication system 200 can include the intended receiving node 202, a reflecting node 204 that can reflect signals to (or from) the intended receiving node 202, and an aggressor node 206 that transmits interfering signals, also referred to as unwanted jamming signals, that are received by the intended receiving node 202 as the intended receiving node 202 is receiving intended signals from a transmitting node 208. As such, the interfering signals may interfere with receiving the intended signals from the transmitting node 208 at the intended receiving node 202. In accordance with aspects described herein, intended receiving node 202 can cause the interfering signals to also be transmitted by the reflecting node 204 with a phase shift applied to effectively at least partially cancel the interfering signals at the intended receiving node 202.

In an example, intended receiving node 202 may include a controlling component 220 for controlling the reflecting node 204 to apply phase shift or other transmission properties and transmit the modified interfering signals. In another example, controlling component 220 can control the aggressor node 206 to apply a phase shift and transmit the modified interfering signals toward the reflecting node 204 for forwarding to the intended receiving node 202. As described herein, forwarding can include reflecting by a IRS/RIS, transmitted by a repeater, etc.

In an example, reflecting node 204 may include an operating component 222 for operating the reflecting node 204. Where the reflecting node 204 is a reflecting surface (e.g., IRS, RIS, etc.), operating component 222 can receive a configuration (e.g., from the intended receiving node 202) and/or can operate a phase shift applying function, reflection direction, etc. based on the configuration. In another example, where the reflecting node 204 is a repeater, operating component 222 can receive a configuration (e.g., from the intended receiving node 202) and/or can operate a phase shift applying function, beam direction, power or amplification gain, etc. based on the configuration. Moreover, in an example, the wireless communication system 200 may include a control node 210 for receiving the configuration and operating the reflecting node 204. In an example, intended receiving node 202 can communicate with the control node 210 and/or reflecting node 204 over a wireless interface via one or more nodes of the wireless network, over a backhaul interface, etc.

In an example, aggressor node 206 can include a signal forwarding component 224 for forwarding interfering signals to the reflecting node 204 for reflecting or otherwise repeating to the intended receiving node 202. In this example, for signals transmitted by aggressor node 206, signal forwarding component 224 can apply a phase shift to the signals and also transmit the signals with phase shift applied toward the reflecting node 204. The intended receiving node 202 can receive both the interfering signals from the aggressor node 206 and the interfering signals with phase shift applied reflected from the reflecting node 204, which can at least partially cancel the interfering signals at the intended receiving node 202.

Figure 3:
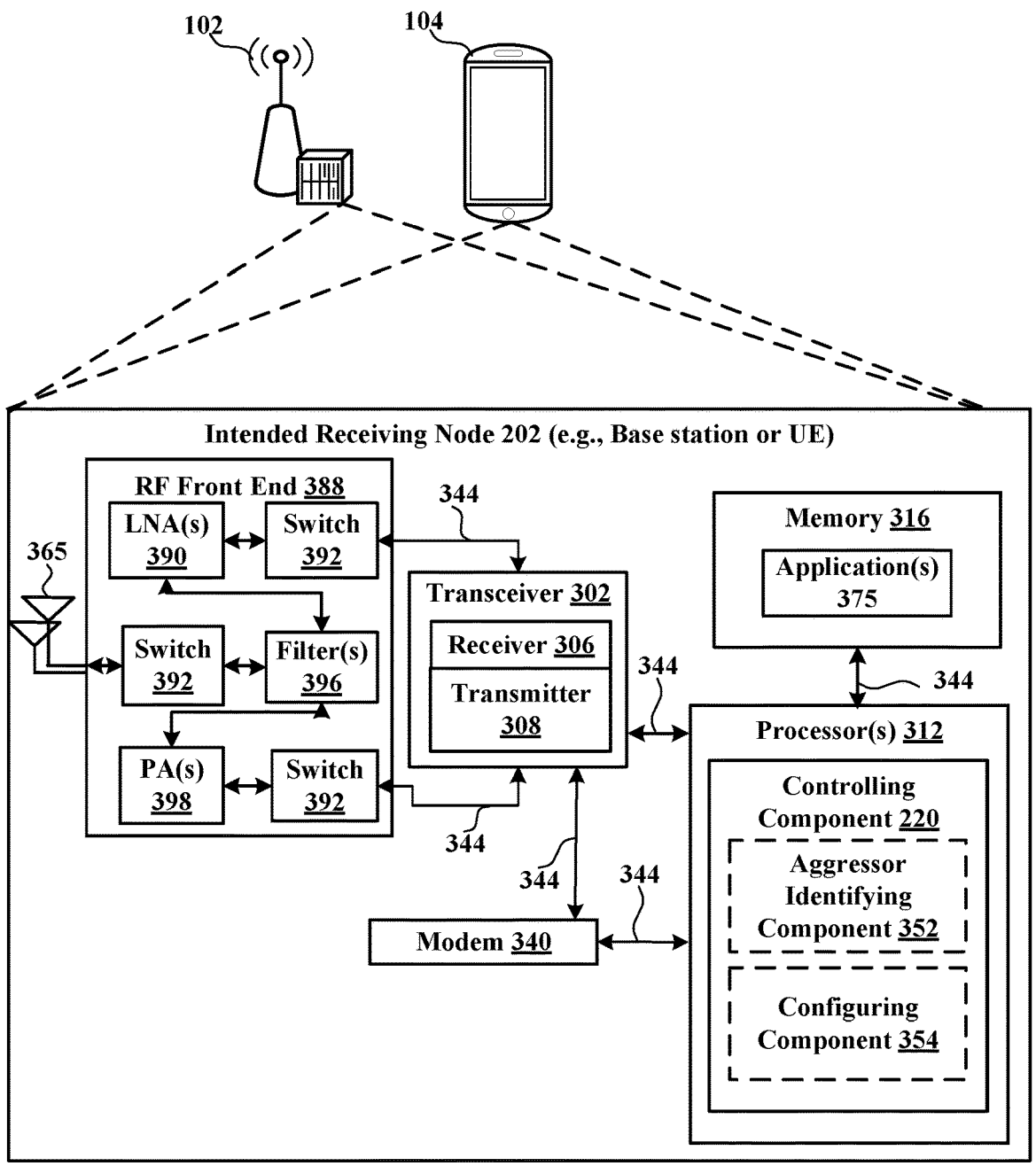
FIG. 3 is a block diagram illustrating an example of an intended receiving node, in accordance with various aspects of the present disclosure.

Referring to FIG. 3, one example of an implementation of an intended receiving node 202, which can include a base station 102, UE 104, etc. may include a variety of components, some of which have already been described above and are described further herein, including components such as one or more processors 312 and memory 316 and transceiver 302 in communication via one or more buses 344, which may operate in conjunction with modem 340 and/or controlling component 220 for controlling a reflecting node 204 or aggressor node 206 to receive interfering signals with phase shifting applied, in accordance with aspects described herein.

In an aspect, the one or more processors 312 can include a modem 340 and/or can be part of the modem 340 that uses one or more modem processors. Thus, the various functions related to controlling component 220 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 340 associated with controlling component 220 may be performed by transceiver 302.

Also, memory 316 may be configured to store data used herein and/or local versions of applications 375 or controlling component 220 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining controlling component 220 and/or one or more of its subcomponents, and/or data associated therewith, when intended receiving node 202 is operating at least one processor 312 to execute controlling component 220 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by one or more nodes, such as a transmitting node 208, which may include a base station, UE, etc., and/or may receive interfering signals from one or more aggressor nodes 206. Additionally, receiver 306 may process such received signals, and also may obtain measurements of the signals, such as, but not limited to, Ec/Io, signal-to-noise ratio (SNR), reference signal received power (RSRP), received signal strength indicator (RSSI), etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, intended receiving node 202 may include RF front end 388, which may operate in communication with one or more antennas 365 and transceiver 302 for receiving and transmitting radio transmissions, for example, wireless communications transmitted by at least one base station or wireless transmissions transmitted by UE. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver 302 may be tuned to operate at specified frequencies such that intended receiving node 202 can communicate with, for example, one or more other nodes, such as a base station or one or more cells associated with one or more base stations, a UE, etc. In an aspect, for example, modem 340 can configure transceiver 302 to operate at a specified frequency and power level based on a configuration specified or received for the intended receiving node 202 and/or based on the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of the intended receiving node 202 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on configuration information associated with the intended receiving node 202. For example, where the intended receiving node 202 is a base station the configuration may be generated by the intended receiving node 202, received from one or more backend network components, and/or the like. For example, where the intended receiving node 202 is a UE, the configuration may be received from the network during connection establishment, cell selection, cell reselection, and/or the like.

In an aspect, controlling component 220 can optionally include an aggressor identifying component 352 for identifying an aggressor node sending interfering signals (or unwanted jamming signals) that interfere with other signals received by the intended receiving node 202 (e.g., intended signals received from a transmitting node 208), and/or a configuring component 354 for configuring at least one of a reflecting node 204 or aggressor node 206 to cause the reflecting node 204 to transmit modified interfering signals having a phase shift applied to allow at least partial cancellation of the interfering signals, in accordance with aspects described herein.

In an aspect, the processor(s) 312 may correspond to one or more of the processors described in connection with the base station or UE in FIG. 13. Similarly, the memory 316 may correspond to the memory described in connection with the base station or UE in FIG. 13.

Figure 4:
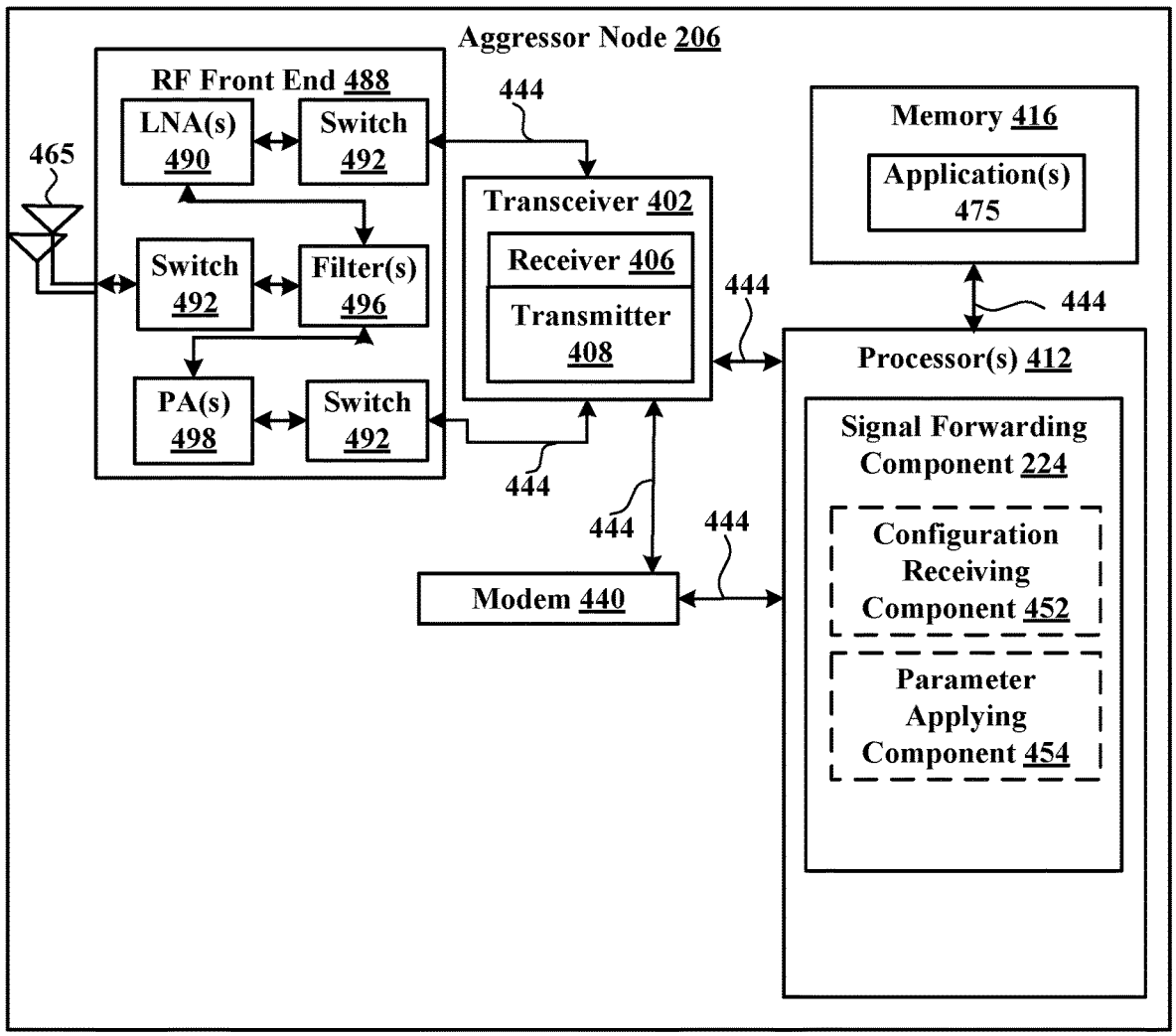
FIG. 4 is a block diagram illustrating an example of an aggressor node, in accordance with various aspects of the present disclosure.

Referring to FIG. 4, one example of an implementation of an aggressor node 206 (e.g., a base station, UE, etc., as described above) may include a variety of components, some of which have already been described above, but including components such as one or more processors 412 and memory 416 and transceiver 402 in communication via one or more buses 444, which may operate in conjunction with modem 440 and/or an optional signal forwarding component 224 for forwarding modified interfering signals to a reflecting node 204, in accordance with aspects described herein.

The transceiver 402, receiver 406, transmitter 408, one or more processors 412, memory 416, applications 475, buses 444, RF front end 488, LNAs 490, switches 492, filters 496, PAs 498, and one or more antennas 465 may be the same as or similar to the corresponding components of intended receiving node 202, as described above in reference to FIG. 3, but configured or otherwise programmed for aggressor node operations (e.g., as a transmitting node) as opposed to intended receiver operations (e.g., as a receiving node).

In an aspect, signal forwarding component 224 can optionally include a configuration receiving component 452 for receiving a configuration for transmitting modified interfering signals, along with the interfering signals, and/or a parameter applying component 454 for applying one or more parameters to the interfering signals to generate the modified interfering signals and/or transmit the modified interfering signals, in accordance with aspects described herein.

In an aspect, the processor(s) 412 may correspond to one or more of the processors described in connection with the base station or UE in FIG. 13. Similarly, the memory 416 may correspond to the memory described in connection with the base station or UE in FIG. 13.

Figure 5:
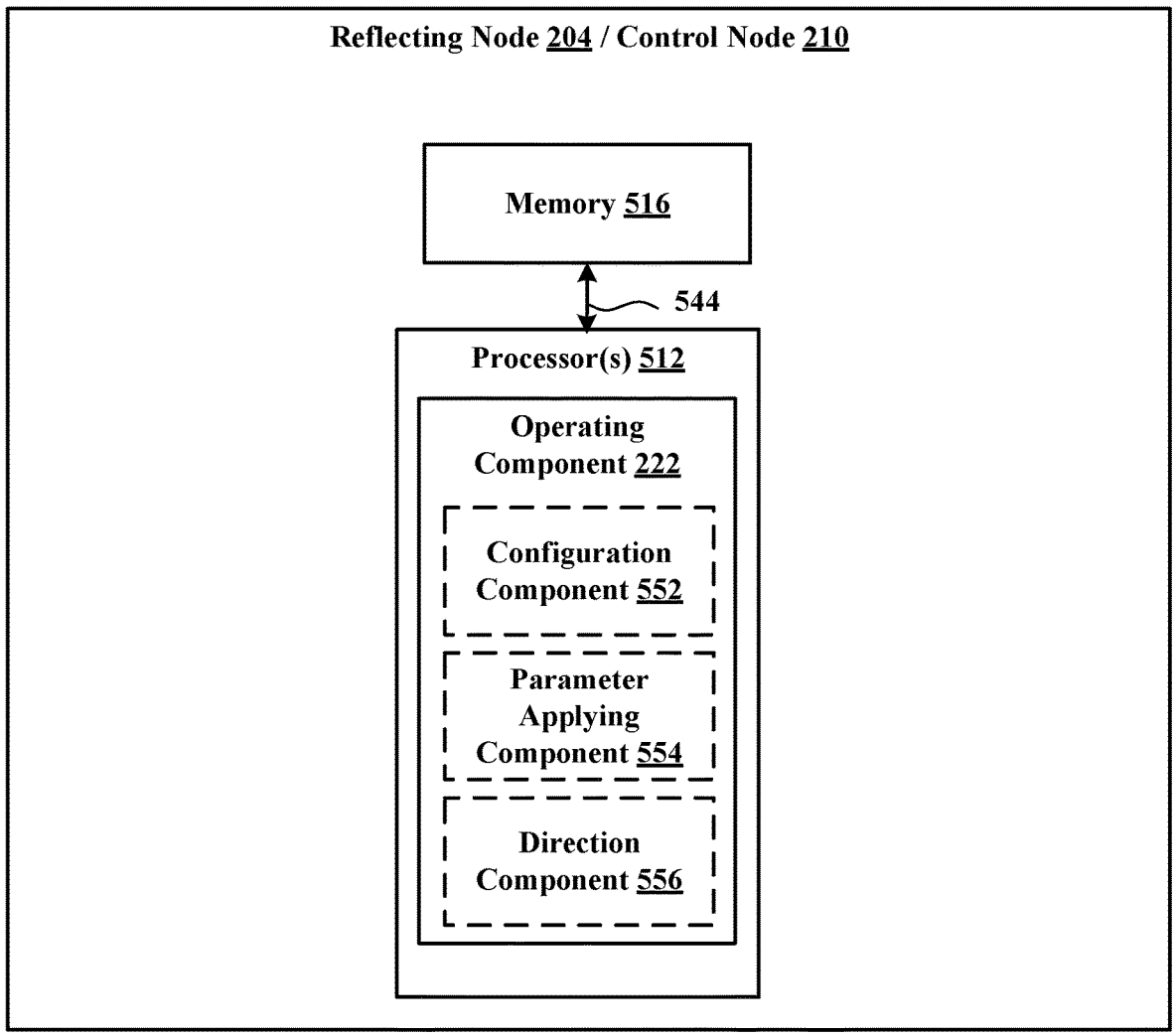
FIG. 5 is a block diagram illustrating an example of a reflecting node or control node, in accordance with various aspects of the present disclosure.

Referring to FIG. 5, one example of an implementation of a reflecting node 204, or control node 210 that controls the reflecting node 204, may include a variety of components, some of which have already been described above, but including components such as one or more processors 512 and/or memory 516 in communication via one or more buses 544. In an example, reflecting node 204 or control node 210 may include wireless communication components described in FIGS. 3 and 4 as well to facilitate communicating with the intended receiving node 202, or may connected to the wireless communication system via a backhaul or other wired connection. Reflecting node 204/control node 210 may include an operating component 222 for controlling operation of the reflecting node 204, such as controlling a phase shift applied to signals, a reflection direction or beam direction for transmitting signals, a transmit power of amplification gain for transmitting signals, and/or the like, in accordance with aspects described herein.

In an aspect, operating component 222 can optionally include a configuration component 552 for receiving a configuration for transmitting modified interfering signals, a parameter applying component 554 for applying one or more parameters to the interfering signals to generate the modified interfering signals and/or transmit the modified interfering signals, and/or a direction component 556 for modifying a reflecting surface direction or beam direction for forwarding or transmitting the modified interfering signals to the intended receiving node 202, in accordance with aspects described herein.

In an aspect, the processor(s) 512 may correspond to one or more of the processors described in connection with the base station or UE in FIG. 13. Similarly, the memory 516 may correspond to the memory described in connection with the base station or UE in FIG. 13.

Figure 6:
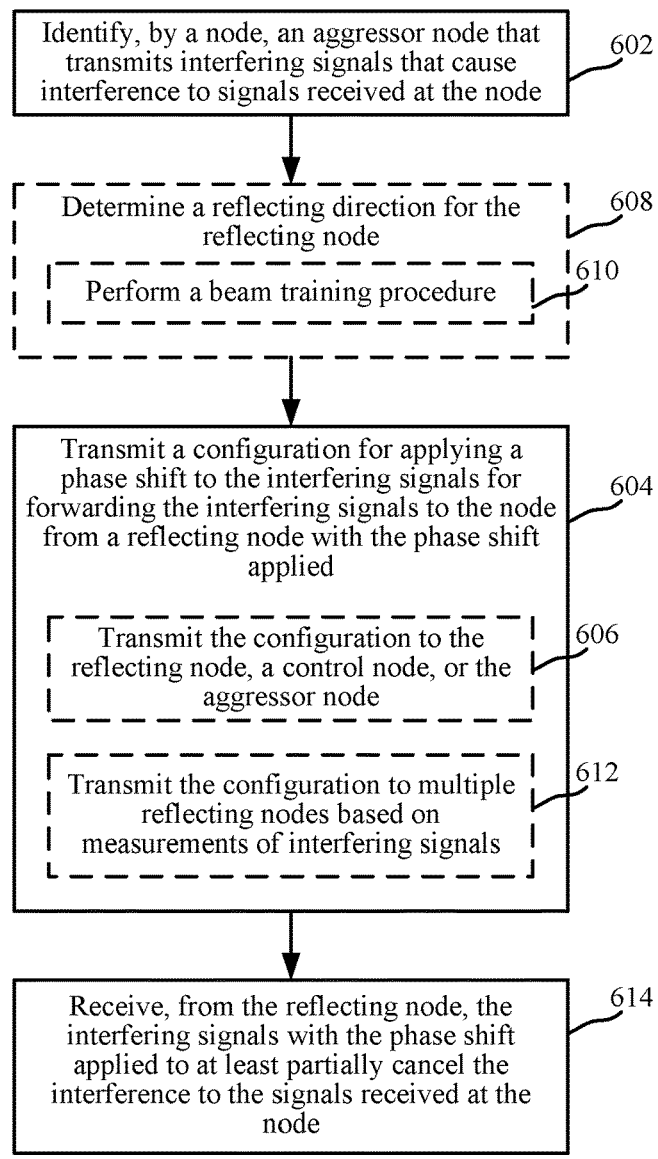
FIG. 6 is a flow chart illustrating an example of a method for causing a reflecting node to forward modified interfering signals from an aggressor node, in accordance with aspects described herein.

FIG. 6 illustrates a flow chart of an example of a method 600 for causing a reflecting node to forward modified interfering signals from an aggressor node, in accordance with aspects described herein. In an example, an intended receiving node 202 (e.g., a UE or base station or other device) can perform the functions described in method 600 using one or more of the components described in FIGS. 2 and 3.

In method 600, at Block 602, an aggressor node that transmits interfering signals that cause interference to signals received by a node can be identified by the node. In an aspect, aggressor identifying component 352, e.g., in conjunction with processor(s) 312, memory 316, transceiver 302, controlling component 220, etc., can identify, by the node (e.g., intended receiving node 202), the aggressor node (e.g., aggressor node 206) that transmits interfering signals that cause interference to signals received at the node (e.g., intended signals received from transmitting node 208). For example, aggressor identifying component 352 can identify the aggressor node 206 transmitting the interfering signals based on prior measurements of signals from the aggressor node 206 (e.g., determining that the interfering signals and prior interfering signals are of a similar power).

In another example, aggressor identifying component 352 can identify the aggressor node 206 transmitting the interfering signals based on detecting an identity indicated in the interfering signals or based on side information received from another node (e.g., a control node in the wireless communication system that controls or schedules the aggressor node 206) indicating the aggressor node 206 that transmits on the resources over which the interfering signals are received. In one example, aggressor identifying component 352 can indicate the resources over which the interfering signals are received to a control node in the wireless communication system, which can be the control node 210 that controls the reflecting node 204 or otherwise. In either example, the control node can determine the aggressor node 206. In an example, the control node can indicate the identity of the aggressor node 206 to the intended receiving node 202 or one or more other nodes based on the indication of resources. In another example, the control node can configure the reflecting node 204 or aggressor node 206 to modify interfering signals based on detecting the aggressor node 206, as described herein. In one example, as described, the aggressor node can be the intended receiving node 202 itself transmitting communications in full duplex, where the transmitted communications can cause self-interference to intended signals received from a transmitting node 208.

In method 600, at Block 604, a configuration for applying a phase shift to the interfering signals for forwarding the interfering signals to the node from a reflecting node with the phase shift applied can be transmitted. In an aspect, configuring component 354, e.g., in conjunction with processor(s) 312, memory 316, transceiver 302, controlling component 220, etc., can generate and/or transmit the configuration for applying the phase shift to the interfering signals for forwarding the interfering signals to the node from the reflecting node with the phase shift applied. For example, the configuration (e.g., as generated by the configuring component 354 or otherwise) can indicate a phase shift value (e.g., a number of degrees) to be applied to the interfering signals for reflecting or forwarding to the intended receiving node 202, a reflecting direction or beam direction for the reflecting node 204 to use in reflecting the interfering signals having phase shift applied, a transmit power or amplification gain for the reflecting node 204 to use in reflecting the interfering signals having phase shift applied, etc. For example, where the reflecting node 204 is a IRS/RIS, the reflecting direction may facilitate the phase shift, such that configuring different reflecting directions may cause different phase shifts from the reflecting node 204. As described further herein, the reflecting directions may be configured between the intended receiving node 202 and/or reflecting node 204 using beam training or other procedures where the intended receiving node 202 can measure signals from received from the reflecting node 204 and/or aggressor node 206 using different reflecting directions.

In transmitting the configuration at Block 604, optionally at Block 606, the configuration can be transmitted to the reflecting node, to a control node, or to the aggressor node. In an aspect, configuring component 354, e.g., in conjunction with processor(s) 312, memory 316, transceiver 302, controlling component 220, etc., can transmit the configuration to the reflecting node 204, a control node 210, or the aggressor node 206. For example, configuring component 354 can transmit the configuration to the reflecting node 204, as a IRS, RIS, repeater, and/or the like, to directly control the reflecting node 204 to apply a phase shift to the interfering signals, set a reflecting direction to transmit the interfering signals to the intended receiving node 202, or to receive the interfering signals from the aggressor node 206, set a beam direction for transmitting the interfering signals to the intended receiving node 202, or receiving the interfering signals from the aggressor node 206, etc. In another example, configuring component 354 can transmit the configuration to the control node 210 so the control node 210 can control the reflecting node 204 as described above. In yet another example, configuring component 354 can transmit the configuration, or other request, to the aggressor node 206 to cause the aggressor node 206 to, in addition to transmitting the interfering signals, transmit modified interfering signals (e.g., interfering signals having the phase shift applied) toward the reflecting node 204 for reflecting/forwarding to the intended receiving node 202.

For example, where configuring component 354 generates the configuration for, and/or transmits the configuration to, the reflecting node 204 or control node 210 for the reflecting node 204, the configuration may indicate one or more of a phase shift to apply to the signal (e.g., a pi phase shift or 180 degree phase shift in amplitude), a reflecting direction for receiving or forwarding the interfering signals, etc. For example, the phase shift can be for applying when repeating a received signal at the reflecting node 204 and/or after amplification of the repeated signal, if the reflecting node 204 is amplifying the repeated signal.

In an example, in method 600, optionally at Block 608, a reflecting direction for the reflecting node can be determined. In an aspect, configuring component 354, e.g., in conjunction with processor(s) 312, memory 316, transceiver 302, controlling component 220, etc., can determine the reflecting direction for the reflecting node. In one example, a spatial direction between the reflecting node 204 and the intended receiving node 202 may be known (e.g., based on prior measurements of signals received from the reflecting node 204 at the intended receiving node 202). In this case, this forwarding/reflecting direction of the reflecting node 204 can remain fixed, and configuring component 354 can configure the reflecting direction (e.g., to the reflecting node 204) for reflecting, forwarding, or otherwise transmitting the interfering signals with phase shift applied to the intended receiving node 202 based on the spatial direction.

In another example, the spatial direction between the reflecting node 204 and the intended receiving node 202, for forwarding signals from the reflecting node 204 to the intended receiving node 202, may not be known and may be discerned based on finding or training a beam/reflection configuration. In an example, in determining the reflecting direction at Block 608, optionally at Block 610, a beam training procedure can be performed. In an aspect, configuring component 354, e.g., in conjunction with processor(s) 312, memory 316, transceiver 302, controlling component 220, etc., can perform the beam training procedure (e.g., with the reflecting node 204) to determine the reflecting direction for the reflecting node 204. In this example, the reflecting node 204 can try multiple forwarding directions toward the intended receiving node 202, and can select one based on measurements received from the intended receiving node 202, an indication from the intended receiving node 202 of a desired direction/beam, etc., as part of the beam training procedure. For example, the reflecting direction can be selected to correspond to a direction that results in a highest signal measurement at the intended receiving node 202. In any case, for example, configuring component 354 can configure the reflecting direction (e.g., to the reflecting node 204) for reflecting, forwarding, or otherwise transmitting the interfering signals with phase shift applied based on the beam (or direction) training procedure.

In another example, the spatial direction between the reflecting node 204 and the aggressor node 206, for receiving the interfering signals from the aggressor node 206, may be known. In this example, the reflector node 204 or control node 210 may identify the aggressor node 206 (e.g., based on aggressor identification information received from the intended receiving node 202) and can accordingly configure the reflecting node 204 to create a beam toward the aggressor node 206 for receiving the interfering signals, as described herein.

In another example, the spatial direction between the reflecting node 204 and the aggressor node 206, for receiving the interfering signals from the aggressor node 206, may not be known, and may be discerned based on finding or training a beam/reflection configuration. Where the reflecting direction between the reflecting node 204 and the intended receiving node 202 is known or determined, configuring component 354 can perform the beam training procedure with the reflecting node 204, where the reflecting node 204 can receive interfering signals from the aggressor node 206 in multiple receive beam directions (toward the aggressor node 206). Based on measurements by the intended receiving node 202 of the interfering signals forwarded from the reflecting node 204, a proper configuration of a receive beam can be selected. As described, in one example, configuring component 354 can report the measurements, and reflecting node 204 or control node 210 can set the receive beam direction, or configuring component 354 can select and indicate the receive beam direction, etc.

In an example, configuring component 354 can determine the phase shift value to indicate in the configuration for applying, by the reflecting node 204 or aggressor node 206, to the interfering signals. For example, configuring component 354 can determine the phase shift value to be properly selected to minimize the interference/jamming at the intended receiving node 202. In one example, configuring component 354 can determine the phase shift value based on the prior measurements of signals received from the reflecting node 204, as described above. For example, a candidate phase shift value can be known (e.g., as reported by the intended receiving node 202 to the control node 210) and provided to the reflecting node 204. In another example, the reflecting node 204 can be provided (e.g., by the configuring component 354 or otherwise) with a set of multiple shift values to be adopted on a given set of associated resources to forward incoming signals. In one example the reflecting node 204 can be provided with a first value for the phase shift, then after performing measurements at the intended receiving node 202, the reflecting node 204 can be provided with a second value for the phase shift, the after performing measurements at the intended receiving node 202, the reflecting node 204 can be provided with a third value for the phase shift, and so on, until a desired measurement is achieved at the intended receiving node 202.

For example, where configuring component 354 generates the configuration for, and/or transmits the configuration to, the aggressor node 206, the configuration may include a request or one or more parameters to assist the aggressor node 206 in reducing its interference at the intended receiving node 202. For example, the configuration can include one or more parameters related to the aggressor node 206 sending the same (jamming/interfering) signal toward the reflecting node 204 on the occasions its communications (with a different node) cause issues at the intended receiving node 202. In one example, the one or more parameters may indicate to transmit the interfering signals toward the aggressor node 206, to apply the phase shift to the interfering signals, and/or the like. In an example, if the aggressor node 206 sends this signal toward the reflecting node 204 using a different beam (than the beam used for the communication with the different node), the aggressor node 206 may further apply a proper phase shift on the copy of the signal sent toward the reflecting node 204, as described herein.

In another example, in transmitting the configuration at Block 604, optionally at Block 612, the configuration can be transmitted to multiple reflecting nodes based on measurements of interfering signals. In an aspect, configuring component 354, e.g., in conjunction with processor(s) 312, memory 316, transceiver 302, controlling component 220, etc., can transmit the configuration to multiple reflecting nodes based on measurements of interfering signals. For example, multiple reflecting nodes 204 may be in the vicinity of the intended receiving node 202 and the aggressor node 206. In this example, the multiple reflecting nodes 204 may be jointly trained (e.g., each reflecting node 204 can be instructed to adopt a given configuration and multiple reflecting nodes 204 may concurrently or simultaneously forward signals toward the intended receiving node 202). For example, configuring component 354 can configure the multiple reflecting nodes 204 with separate configurations, which may indicate different phase shifts, reflecting directions, etc., based on spatial position of each reflecting node, signal measurements of signal received from each reflecting node 204, etc. In this example, based on measurements at the intended receiving node 202, a subset of reflecting nodes 204 and a set of proper configurations can be selected such that the superposition of the multiple received signals from the multiple reflecting nodes 204 can lead to minimized jamming/interference at the intended receiving node 202.

In one example, as described, the reflecting node 204 can be a repeater that can include a transceiver for receiving and transmitting signals. In an example, the repeater can also include a power amplifier, a digital-to-analog converter (DAC), and/or the like. In some examples, configuring component 354 can generate or transmit the configuration to include information for operating the repeater to forward signals from the aggressor node 206, such as, in addition or alternatively to the phase and direction, a transmit power or amplification gain that the repeater can use in transmitting the interfering signals with phase shift applied. In an example, the repeater can digitize the incoming signal, and/or may be instructed (e.g., by the configuration) to filter and/or forward the portion of bandwidth that carries the interfering/jamming signal, such that the entire signal need not be forwarded toward the intended receiving node 202

(e.g., only the portion of bandwidth that interferes the signals received at intended receiving node 202). In this example, configuring component 354 can indicate in the configuration the bandwidth to filter. In another example, the configuration can indicate a delay to introduce in forwarding the signal to align the receive timings of the forwarded jamming signal and the original jamming signal at the intended receiving node 202. This can be beneficial, for example, where the original signal is not directly received by the intended receiving node 202 (e.g., not line-of-sight (LOS)), because otherwise the forwarded signal may be received later than the direct LOS signal).

In method 600, at Block 614, the interfering signals with the phase shift applied can be received, from the reflecting node, to at least partially cancel the interference to the signals received at the node. In an aspect, transceiver 302, e.g., in conjunction with processor(s) 312, memory 316, etc., can receive, from the reflecting node 204, the interfering signals with the phase shift applied to at least partially cancel the interference to the signals received at the node. As described, for example, the interfering signals having the phase shift applied as forwarded by the reflecting node 204 can combine with the interfering signals received from the aggressor node 206 to effectively at least partially cancel the interfering signals. As such, intended signals received from other nodes (e.g., transmitting node 208) can be received at the intended receiving node 202 with reduced, or mitigated, or cancelled, interference of signals from the aggressor node 206.

For example, the concepts described above can be used for an intended receiving node 202, which may include a base station receiving uplink signals, where the base station is equipped with a single receive antenna, a UE (e.g., IoT UE) receiving downlink signals, where the UE has a single receive antenna, etc. Where the intended receiving node 202 is equipped with multiple receive antennas, the intended receiving node 202 itself may have the capability of mitigating the interfering signals. There may be scenarios, however, where (1) interfering signal may come in a similar direction to the intended signal from the transmitting node 208, in which case the receiver may desired to balance mitigating the interfering signal while not impairing the intended signal, or (2) the intended receiving node 202 desires to use its multiple receive antennas for spatial multiplexing and using some degree of freedom for interfering signal mitigation may reduce the degrees of freedom left for spatial multiplexing. In either of the above scenarios, a nearby reflecting node can assist mitigating interfering signals.

Figure 7:
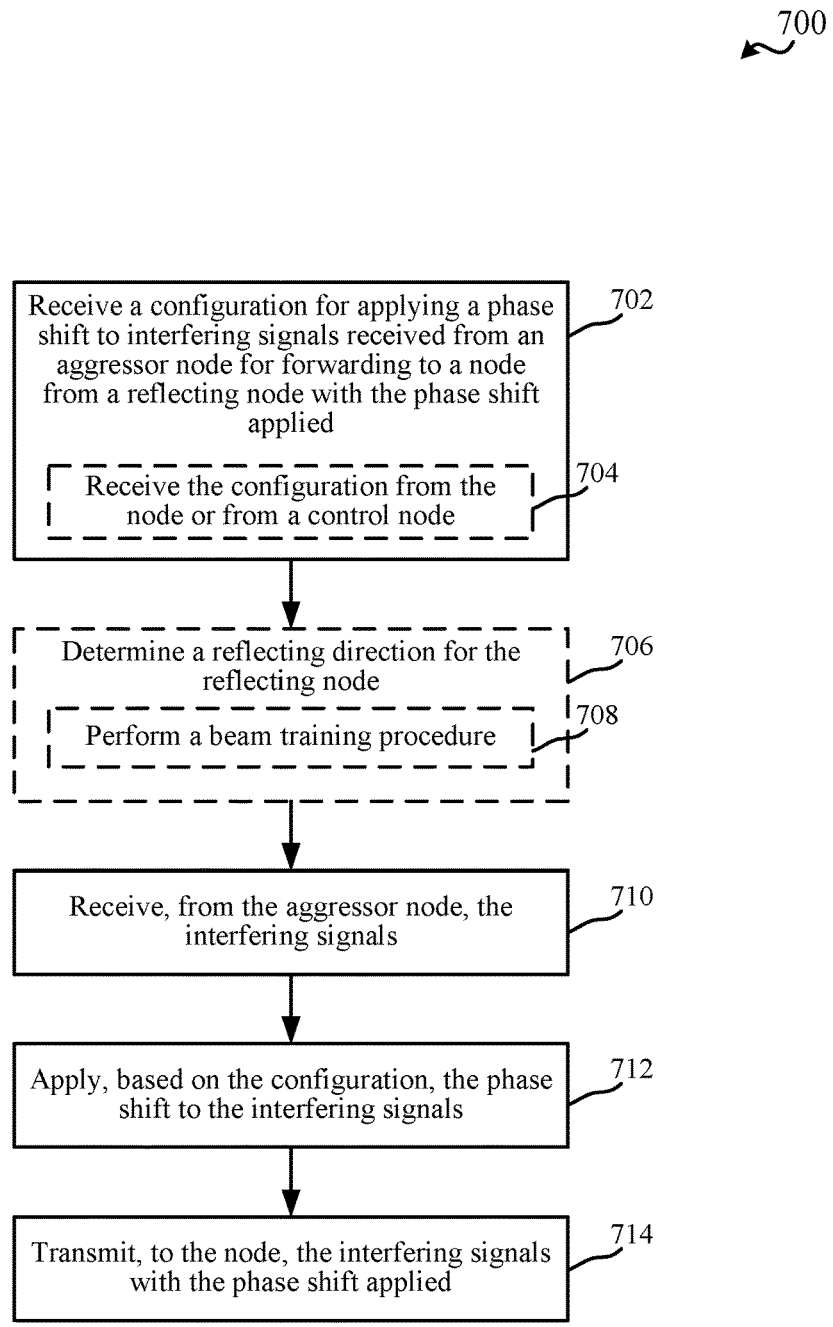
FIG. 7 is a flow chart illustrating an example of a method for forwarding modified interfering signals from an aggressor node, in accordance with aspects described herein.

FIG. 7 illustrates a flow chart of an example of a method 700 for forwarding modified interfering signals from an aggressor node, in accordance with aspects described herein. In an example, a reflecting node 204 or control node 210 operating with a reflecting node 204 can perform the functions described in method 700 using one or more of the components described in FIGS. 2 and 5.

In method 700, at Block 702, a configuration for applying a phase shift to interfering signals received from an aggressor node for forwarding to a node from a reflecting node with the phase shift applied can be received. In an aspect, configuration component 552, e.g., in conjunction with processor(s) 512, memory 516, operating component 222, etc., can receive the configuration for applying the phase shift to the interfering signals received from an aggressor node (e.g., aggressor node 206) for forwarding to the node (e.g., intended receiving node 202) from the reflecting node (e.g., reflecting node 204) with the phase shift applied. For example, the configuration can indicate a phase shift value to be applied to the interfering signals for reflecting or forwarding to the intended receiving node 202, a reflecting direction or beam direction for the reflecting node 204 to use in reflecting the interfering signals having phase shift applied, a transmit power or amplification gain for the reflecting node 204 to use in reflecting the interfering signals having phase shift applied, etc.

In receiving the configuration at Block 702, optionally at Block 704, the configuration can be received from the node or from a control node. In an aspect, configuration component 552, e.g., in conjunction with processor(s) 512, memory 516, operating component 222, etc., can receive the configuration from the node (e.g., intended receiving node 202), the control node (e.g., control node 210), etc. For example, the configuration can be for the reflecting node 204 operating as a IRS, RIS, repeater, and/or the like, to directly control the reflecting node 204 to apply a phase shift to the interfering signals, set a reflecting direction to transmit the interfering signals to the intended receiving node 202, or to receive the interfering signals from the aggressor node 206, set a beam direction for transmitting the interfering signals to the intended receiving node 202, or receiving the interfering signals from the aggressor node 206, etc.

In an example, in method 700, optionally at Block 706, a reflecting direction for the reflecting node can be determined. In an aspect, direction component 556, e.g., in conjunction with processor(s) 512, memory 516, operating component 222, etc., can determine the reflecting direction for the reflecting node. In one example, a spatial direction between the reflecting node 204 and the intended receiving node 202 may be known (e.g., based on prior measurements of signals received from the reflecting node 204 at the intended receiving node 202). In this case, this forwarding/reflecting direction of the reflecting node 204 can remain fixed, and direction component 556 can determine the reflecting direction for reflecting, forwarding, or otherwise transmitting the interfering signals with phase shift applied to the intended receiving node 202 based on the spatial direction.

In another example, the spatial direction between the reflecting node 204 and the intended receiving node 202, for forwarding signals from the reflecting node 204 to the intended receiving node 202, may not be known and may be discerned based on finding or training a beam/reflection configuration. In an example, in determining the reflecting direction at Block 706, optionally at Block 708, a beam training procedure can be performed. In an aspect, direction component 556, e.g., in conjunction with processor(s) 512, memory 516, operating component 222, etc., can perform the beam training procedure (e.g., with the intended receiving node 202) to determine the reflecting direction for the reflecting node 204. In this example, the reflecting node 204 can try multiple forwarding directions toward the intended receiving node 202, and can select one based on measurements received from the intended receiving node 202, an indication from the intended receiving node 202 of a desired direction/beam, etc., as part of the beam training procedure. In any case, for example, direction component 556 can configure the reflecting direction or receive the direction in the configuration from the intended receiving node 202 for reflecting, forwarding, or otherwise transmitting the interfering signals with phase shift applied based on the beam (or direction) training procedure.

In another example, the spatial direction between the reflecting node 204 and the aggressor node 206, for receiving the interfering signals from the aggressor node 206, may be known. In this example, direction component 556 may identify the aggressor node 206 (e.g., based on aggressor identification information received from the intended receiving node 202) and/or can accordingly configure the direction component 556 to create a beam toward the aggressor node 206 for receiving the interfering signals, as described herein.

In another example, the spatial direction between the reflecting node 204 and the aggressor node 206, for receiving the interfering signals from the aggressor node 206, may not be known, and may be discerned based on finding or training a beam/reflection configuration. Where the reflecting direction between the reflecting node 204 and the intended receiving node 202 is known or determined, direction component 556 can perform the beam training procedure with the intended receiving node 202, where the reflecting node 204 can receive interfering signals from the aggressor node 206 in multiple receive beam directions (toward the aggressor node 206). Based on measurements by the intended receiving node 202 of the interfering signals forwarded from the reflecting node 204, a proper configuration of a receive beam can be selected. As described, in one example, direction component 556 can receive a reporting of the measurements from the intended receiving node 202, and direction component 556 can set the receive beam direction, or intended receiving node 202 can select and indicate the receive beam direction, etc.

In method 700, at Block 710, the interfering signals can be received from the aggressor node. In an aspect, operating component 222, e.g., in conjunction with processor(s) 512, memory 516, etc., can receive the interfering signals from the aggressor node (e.g., aggressor node 206). In one example, operating component 222 can receive the interfering signals based on direction component 556 setting a reflecting direction or a beam direction for receiving the interfering signals from the aggressor node 206, as described above. Where the reflecting node 204 is a IRS/RIS, receiving the interfering signals may be a passive operation such that receiving the interfering signals and reflecting the interfering signals can occur without consuming radio resources typically associated with an actively communicating wireless node, such as a base station, UE, repeater, etc. Where the reflecting node 204 is a repeater, receiving the interfering signals may occur via a receiver portion of a transceiver, as described.

In method 700, at Block 712, the phase shift can be applied to the interfering signals based on the configuration. In an aspect, parameter applying component 554, e.g., in conjunction with processor(s) 512, memory 516, operating component 222, etc., can apply, based on the configuration, the phase shift to the interfering signals. As described, for example, parameter applying component 554 can apply a fixed phase shift, such as a pi phase shift, 180 degree phase shift, etc. In another example, parameter applying component 554 can determine the phase shift to apply from the configuration received from the intended receiving node 202 or control node 210. Moreover, as described, parameter applying component 554 can determine the phase shift to apply based on signal measurements received from the intended receiving node 202. In an example, parameter applying component 554 can determine the phase shift iteratively, by applying phase shifts and analyzing signal measurements received from the intended receiving node 202 to determine whether to apply a different phase shift, etc. In an example, where the reflecting node 204 is a IRS/RIS, parameter applying component 554 can apply the fixed phase shift by setting a reflecting direction of the IRS/RIS, where different directions can reflect signals having different phase shifts. As described, for example, the reflecting node 204 and/or intended receiving node 202 can set the reflecting direction to achieve the phase shift based on a beam training procedure or other procedure where the intended receiving node 202 can measure signals received from the reflecting node 204 and/or aggressor node 206.

In another example, parameter applying component 554 can apply other parameters to the interfering signals prior to transmission/forward to the intended receiving node 202, where the other parameters may be additionally or alternatively indicated in the configuration. In one example, parameter applying component 554 can apply a bandwidth filter to the interfering signals to forward only a portion of the bandwidth of the interfering signals, or may apply a delay to delay the transmission of the interfering signals. In another example, parameter applying component 554 can apply a transmit power or amplification gain to the interfering signals prior to transmission.

In method 700, at Block 714, the interfering signals with the phase shift applied can be transmitted to the node. In an aspect, operating component 222, e.g., in conjunction with processor(s) 512, memory 516, etc., can transmit, to the node (e.g., intended receiving node 202), the interfering signals with the phase shift applied. For example, operating component 222 can transmit the interfering signals with the phase shift applied to the intended receiving node 202 to allow for at least partially cancelling the interfering signals received from the aggressor node 206 at the intended receiving node 202. In another example, operating component 222 can transmit the interfering signals filtered down to the bandwidth of interference indicated by the intended receiving node 202. In another example, operating component 222 can transmit the interfering signals at a delay, transmit power or amplitude gain, etc., as described above. In an example, transmitting the interfering signals can include forwarding the interfering signals, as described herein. Forwarding can include passive reflecting (e.g., where the reflecting node is a IRS/RIS), transmitting using a transmitter portion of a transceiver (e.g., where the reflecting node is a repeater), etc.

Figure 8:
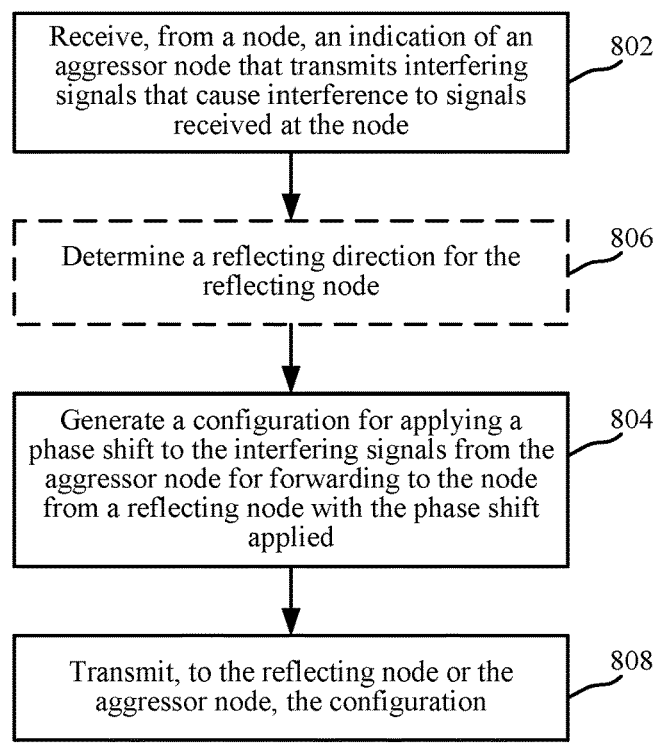
FIG. 8 is a flow chart illustrating an example of a method for generating a configuration for modifying interfering signals of an aggressor node, in accordance with aspects described herein.

FIG. 8 illustrates a flow chart of an example of a method 800 for generating a configuration for modifying interfering signals of an aggressor node, in accordance with aspects described herein. In an example, a control node 210 can perform the functions described in method 800 using one or more of the components described in FIGS. 2 and 5.

In method 800, at Block 802, an indication of an aggressor node that transmits interfering signals that cause interference to signals received at a node can be received from the node. In an aspect, configuration component 552, e.g., in conjunction with processor(s) 512, memory 516, operating component 222, etc., can receive, from the node (e.g., intended receiving node 202), the indication of the aggressor node (e.g., aggressor node 206) that transmits interfering signals that cause interference to signals received at the node. For example, configuration component 552 can receive the indication of the aggressor node 206 as an indication of resources over which the intended receiving node 202 is experiencing interference that is over a threshold measure of interference (e.g., over a number of decibels). In another example, configuration component 552 can receive the indication of the aggressor node 206 as an identifier of the aggressor node 206 detected by the intended receiving node 202.

In method 800, at Block 804, a configuration for applying a phase shift to the interfering signals from the aggressor node for forwarding to the node from a reflecting node with the phase shift applied can be generated. In an aspect, configuration component 552, e.g., in conjunction with processor(s) 512, memory 516, operating component 222, etc., can generating the configuration for applying the phase shift to the interfering signals from the aggressor node (e.g., aggressor node 206) for forwarding to the node (e.g., intended receiving node 202) from the reflecting node (e.g., reflecting node 204) with the phase shift applied. For example, the configuration can indicate a value for the phase shift. The configuration may indicate other parameters in addition, or alternatively, to the phase shift, such as a reflecting direction for the reflecting node 204, a transmit power or amplification gain, a delay, a bandwidth filter, etc., as described. For example, configuration component 552 can determine the bandwidth filter based on determining the resources over which the intended receiving node 202 is experiencing the interference or other indication from the intended receiving node 202.

In an example, in method 800, optionally, at Block 806, a reflecting direction for the reflecting node can be determined. In an aspect, direction component 556, e.g., in conjunction with processor(s) 512, memory 516, operating component 222, etc., can determine the reflecting direction for the reflecting node (e.g., reflecting node 204). As described, for example, direction component 556 can determine the reflecting direction for the reflecting node 204 for receiving interfering signals from the aggressor node 206 and/or for transmitting/forwarding the interfering signals to the intended receiving node 202. In one example, direction component 556 can determine the reflecting direction based on a spatial direction between the reflecting node 204 and the intended receiving node 202 and/or aggressor node 206. In other examples, as described, direction component 556 can determine or can be configured with the reflecting direction based on beam training performed between the reflecting node 204 and the intended receiving node 202.

In method 800, at Block 808, the configuration can be transmitted to the reflecting node or the aggressor node. In an aspect, configuration component 552, e.g., in conjunction with processor(s) 512, memory 516, operating component 222, etc., can transmit, to the reflecting node (e.g., reflecting node 204) or the aggressor node (e.g., aggressor node 206), the configuration. For example, the control node 210 may transmit the configuration to the reflecting node 204 or aggressor node 206 over a backhaul connection therewith, over a wireless interface, and/or the like. The reflecting node 204 or aggressor node 206 can receive the configuration and apply the phase shift or other parameters in transmitting interfering signals, as described above and further herein.

Figure 9:
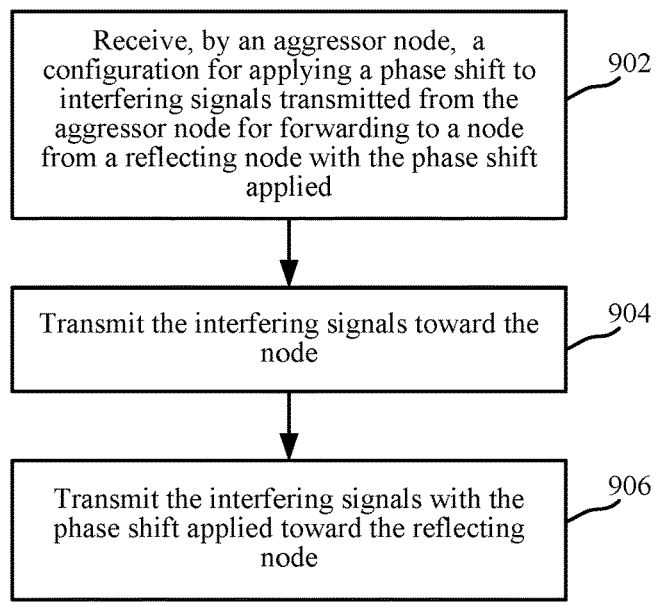
FIG. 9 is a flow chart illustrating an example of a method for modifying interfering signals at an aggressor node, in accordance with aspects described herein.

FIG. 9 illustrates a flow chart of an example of a method 900 for modifying interfering signals at an aggressor node, in accordance with aspects described herein. In an example, an aggressor node 206 can perform the functions described in method 900 using one or more of the components described in FIGS. 2 and 4.

In method 900, at Block 902, a configuration for applying a phase shift to interfering signals transmitted from an aggressor node for forwarding to a node from a reflecting node with the phase shift applied can be received by the aggressor node. In an aspect, configuration receiving component 452, e.g., in conjunction with processor(s) 412, memory 416, transceiver 402, signal forwarding component 224, etc., can receive the configuration for applying the phase shift to the interfering signals transmitted from the aggressor node 206 for forwarding to the node (e.g., intended receiving node 202) from the reflecting node (e.g., reflecting node 204) with the phase shift applied. For example, the configuration can indicate a phase shift value to be applied to the interfering signals for transmitting toward the reflecting node 204, a beam direction for the aggressor node 206 to use in transmitting the interfering signals toward the reflecting node 204, etc.

In method 900, at Block 904, the interfering signals can be transmitted toward the node. In an aspect, transceiver 402, e.g., in conjunction with processor(s) 412, memory 416, etc., can transmit the interfering signals toward the node (e.g., intended receiving node 202), which can include transmitting the interfering signals as signals intended for a different node. In the examples described herein, intended receiving node 202 can be the intended receiver for signals from the transmitting node 208 but not from aggressor node 206. The interfering signals can interfere with reception at the intended receiving node 202, however, as described.

In method 900, at Block 906, the interfering signals with the phase shift applied can be transmitted toward the reflecting node. In an aspect, signal forwarding component 224, e.g., in conjunction with processor(s) 412, memory 416, transceiver 402, etc., can transmit the interfering signals with the phase shift applied toward the reflecting node (e.g., reflecting node 204). This can cause the reflecting node 204 to transmit/forward the interfering signals with the phase shift applied to the intended receiving node 202. Thus, as described, the intended receiving node 202 can receive the interfering signals and the interfering signals with the phase shift applied to at least partially cancel the interfering signals.

Figure 10:
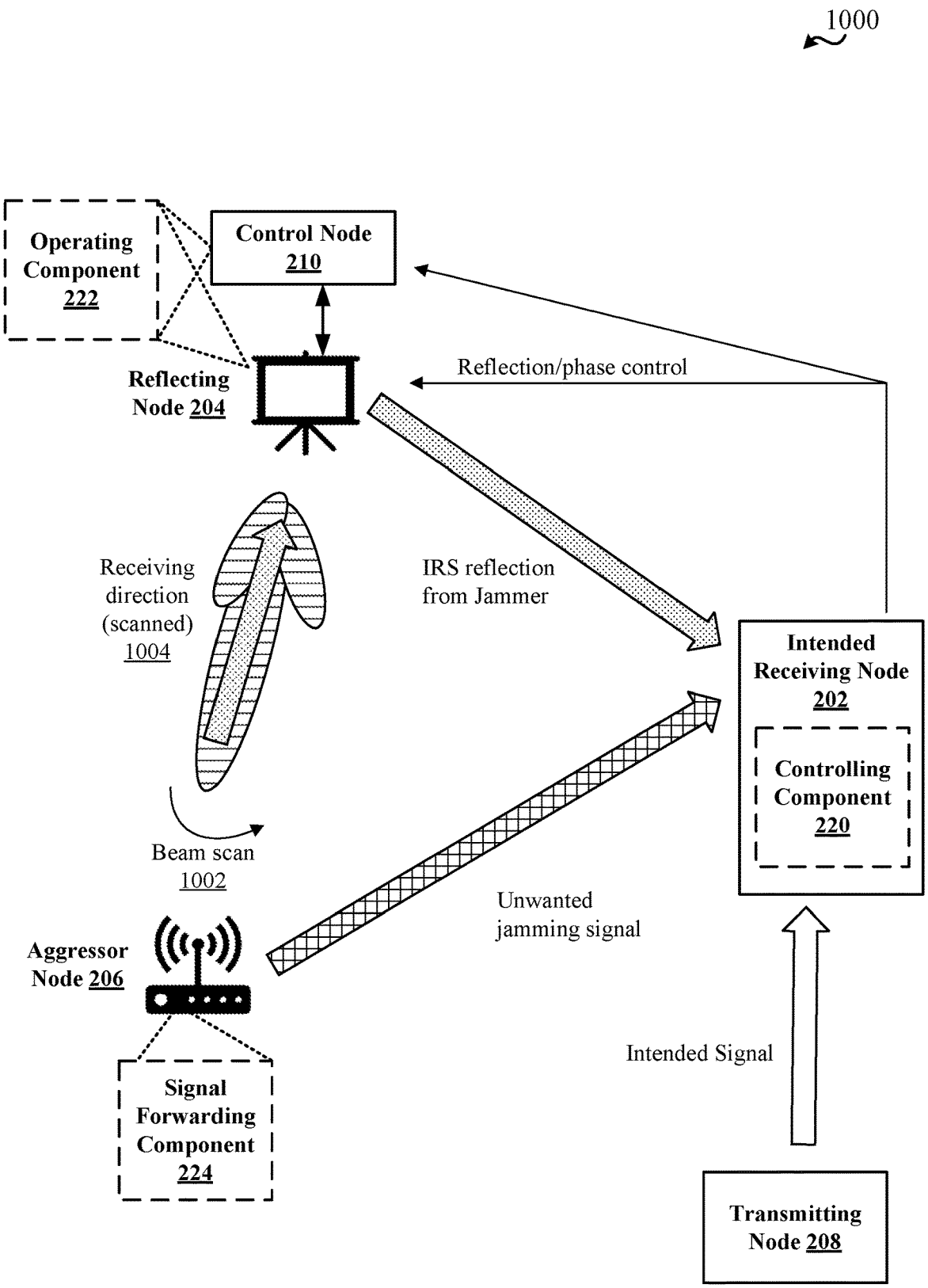
FIG. 10 illustrates an example of a wireless communication system for performing a beam training procedure to determine a reflecting direction for the reflecting node, in accordance with aspects described herein.

FIG. 10 illustrates an example of a wireless communication system 1000 for performing a beam training procedure to determine a reflecting direction for the reflecting node 204. For example, as described, reflecting node 204 can perform a beam scan 1002 to beamform antenna resources in various receiving directions for determining a beam to use in receiving signals from the aggressor node 206. For example, as described, reflecting node 204 can determine, based on beam scan 1002, to use receiving direction 1004 based on signal measurements received from the intended receiving node 202 of the interfering signals with phase shift applied that are forwarded by the reflecting node 204 to the intended receiving node 202. In an example, intended receiving node 202 can indicate signal measurements to the reflecting node 204 and/or can determine a desired receive beam direction at the reflecting node 204, which can be based on determining which receive beam yields the lowest interfering signal measurement at the intended receiving node 202.

Figure 11:
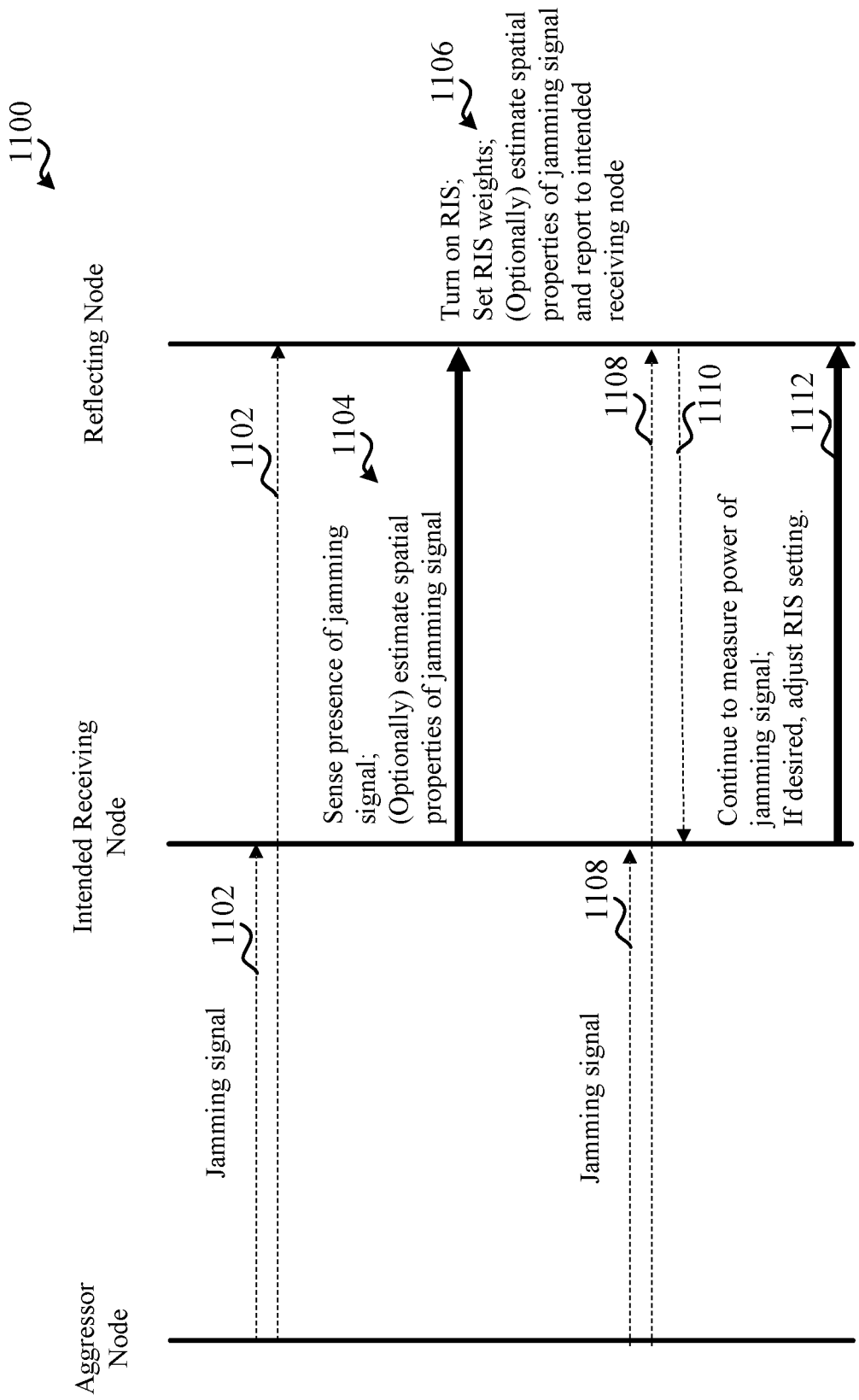
FIG. 11 illustrates an example of a wireless communication system for sending interfering signals from an aggressor node via a reflecting node with a phase shift applied to at least partially cancel the interfering signals at an intended receiving node, in accordance with aspects described herein.

FIG. 11 illustrates an example of a wireless communication system 1100 for sending interfering signals from an aggressor node via a reflecting node with a phase shift applied to at least partially cancel the interfering signals at an intended receiving node. In system 1100, the aggressor node can transmit a jamming signal 1102, which can be received by the intended receiving node and the reflecting node. The intended receiving node can sense presence of the jamming signal at 1104 and can optionally estimate spatial properties of the jamming signal. At 1106, intended receiving node can configure the reflecting node (e.g., RIS) to turn on, set weights for applying a phase shift, and/or optionally estimate spatial properties of the jamming signal for reporting to the intended receiving node. The aggressor node can transmit a jamming signal 1108, which can be received by the intended receiving node and the reflecting node. The reflecting node can then forward the interfering signal with phase shift and/or other parameters applied at 1110 to effectively at least partially cancel interfering signal 1108 at the intended receiving node. At 1112, the intended receiving node may continue to measure power for the jamming signal, and if desired, adjust settings at the reflecting node.

Figure 12:
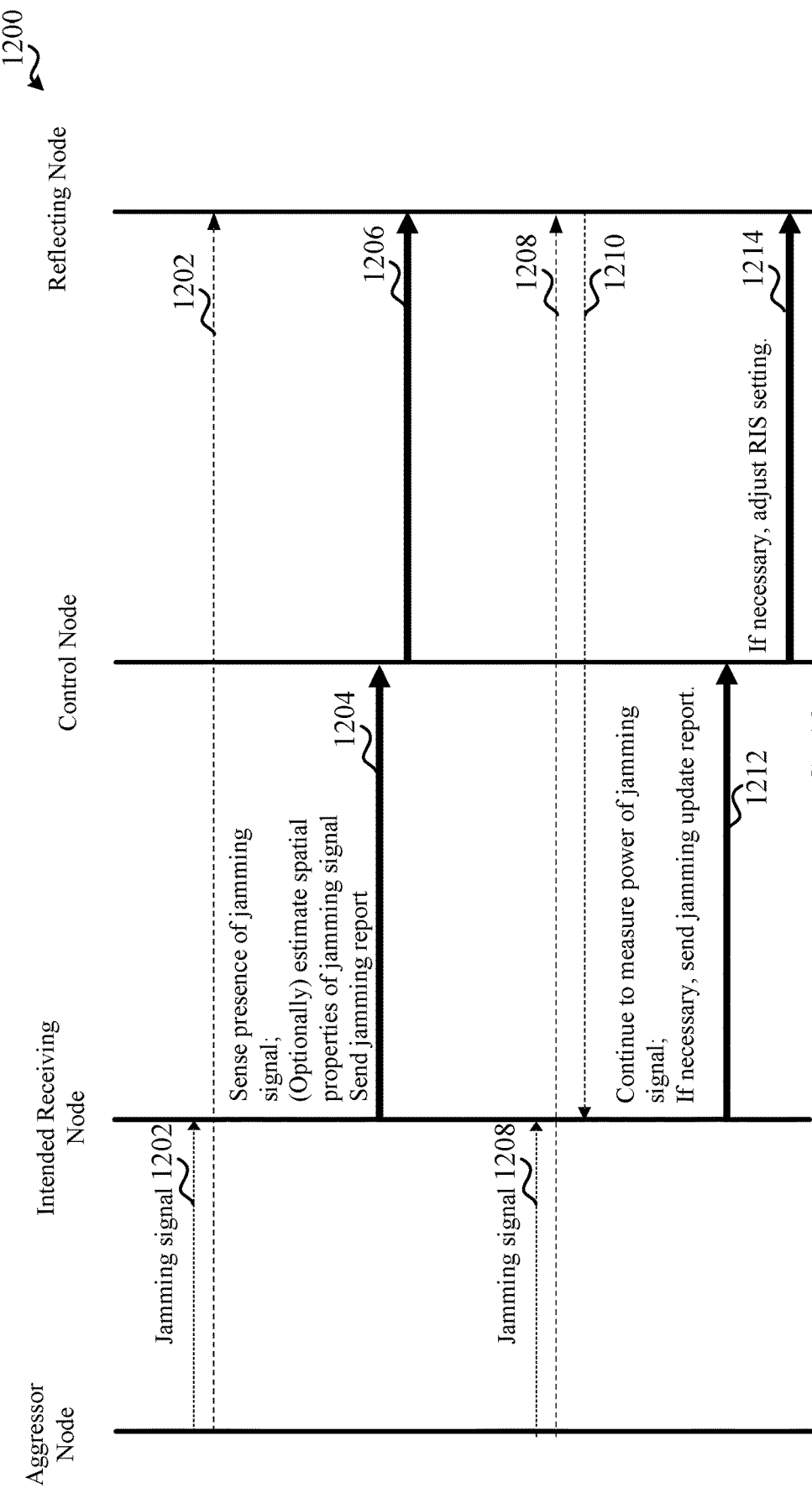
FIG. 12 illustrates an example of a wireless communication system for sending interfering signals from an aggressor node via a reflecting node, configured by a control node, with a phase shift applied to at least partially cancel the interfering signals at an intended receiving node, in accordance with aspects described herein.

FIG. 12 illustrates an example of a wireless communication system 1200 for sending interfering signals from an aggressor node via a reflecting node, configured by a control node, with a phase shift applied to at least partially cancel the interfering signals at an intended receiving node. In system 1200, the aggressor node can transmit a jamming signal 1202, which can be received by the intended receiving node and the reflecting node. The intended receiving node can sense presence of the jamming signal at 1204 and can optionally estimate spatial properties of the jamming signal, and can notify the control node. At 1206, the control node can configure the reflecting node (e.g., RIS) to turn on, set weights for applying a phase shift, and/or optionally estimate spatial properties of the jamming signal for reporting to the control node. The aggressor node can transmit a jamming signal 1208, which can be received by the intended receiving node and the reflecting node. The reflecting node can then forward the interfering signal with phase shift and/or other parameters applied at 1210 to effectively at least partially cancel interfering signal 1208 at the intended receiving node. At 1212, the intended receiving node may continue to measure power for the jamming signal, and if desired, instruct the control node to adjust settings at the reflecting node, and the control node can accordingly adjust the settings at the reflecting node at 1214.

Figure 13:
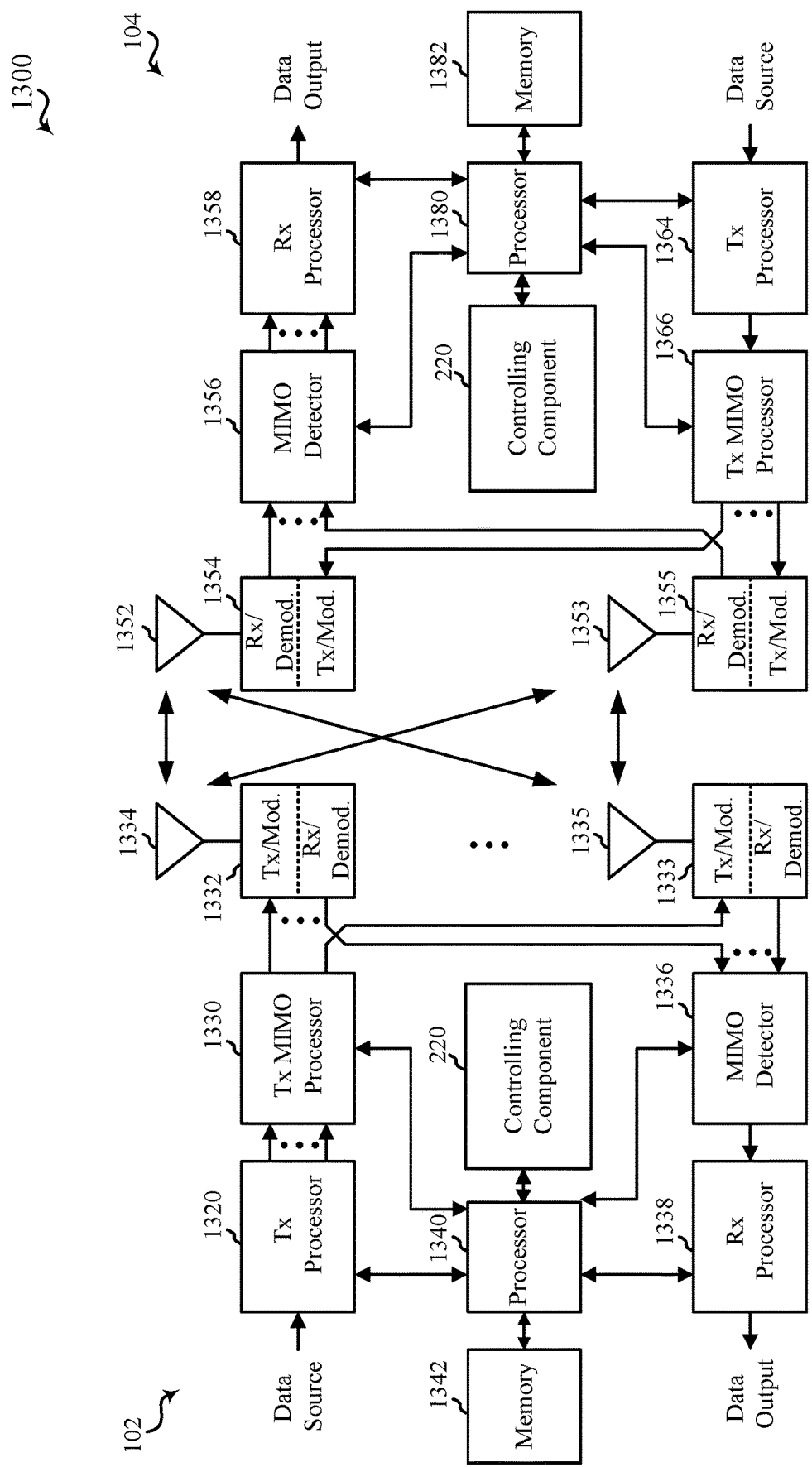
FIG. 13 is a block diagram illustrating an example of a MIMO communication system including a base station and a UE, in accordance with various aspects of the present disclosure.

FIG. 13 is a block diagram of a MIMO communication system 1300 including a base station 102 and a UE 104. The MIMO communication system 1300 may illustrate aspects of the wireless communication access network 100 described with reference to FIG. 1. The base station 102 may be an example of aspects of the base station 102 described with reference to FIG. 1. The base station 102 may be equipped with antennas 1334 and 1335, and the UE 104 may be equipped with antennas 1352 and 1353. In the MIMO communication system 1300, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two. In an example, the base station 102 or UE 104 can be an intended receiving node, aggressor node, control node, etc.

At the base station 102, a transmit (Tx) processor 1320 may receive data from a data source. The transmit processor 1320 may process the data. The transmit processor 1320 may also generate control symbols or reference symbols. A transmit MIMO processor 1330 may perform spatial processing (e.g., precoding) on data symbols, control symbols, or reference symbols, if applicable, and may provide output symbol streams to the transmit modulator/demodulators 1332 and 1333. Each modulator/demodulator 1332 through 1333 may process a respective output symbol stream (e.g., for OFDM, etc.) to obtain an output sample stream. Each modulator/demodulator 1332 through 1333 may further process (e.g., convert to analog, amplify, filter, and upconvert) the output sample stream to obtain a DL signal. In one example, DL signals from modulator/demodulators 1332 and 1333 may be transmitted via the antennas 1334 and 1335, respectively.

The UE 104 may be an example of aspects of the UEs 104 described with reference to FIGS. 1-2. At the UE 104, the UE antennas 1352 and 1353 may receive the DL signals from the base station 102 and may provide the received signals to the modulator/demodulators 1354 and 1355, respectively. Each modulator/demodulator 1354 through 1355 may condition (e.g., filter, amplify, downconvert, and digitize) a respective received signal to obtain input samples. Each modulator/demodulator 1354 through 1355 may further process the input samples (e.g., for OFDM, etc.) to obtain received symbols. A MIMO detector 1356 may obtain received symbols from the modulator/demodulators 1354 and 1355, perform MIMO detection on the received symbols, if applicable, and provide detected symbols. A receive (Rx) processor 1358 may process (e.g., demodulate, deinterleave, and decode) the detected symbols, providing decoded data for the UE 104 to a data output, and provide decoded control information to a processor 1380, or memory 1382.

The processor 1380 may in some cases execute stored instructions to instantiate a controlling component 220 (see e.g., FIGS. 2 and 3).

On the uplink (UL), at the UE 104, a transmit processor 1364 may receive and process data from a data source. The transmit processor 1364 may also generate reference symbols for a reference signal. The symbols from the transmit processor 1364 may be precoded by a transmit MIMO processor 1366 if applicable, further processed by the modulator/demodulators 1354 and 1355 (e.g., for SC-FDMA, etc.), and be transmitted to the base station 102 in accordance with the communication parameters received from the base station 102. At the base station 102, the UL signals from the UE 104 may be received by the antennas 1334 and 1335, processed by the modulator/demodulators 1332 and 1333, detected by a MIMO detector 1336 if applicable, and further processed by a receive processor 1338. The receive processor 1338 may provide decoded data to a data output and to the processor 1340 or memory 1342.

The processor 1340 may in some cases execute stored instructions to instantiate a controlling component 220 (see e.g., FIGS. 2 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 1300. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 1300.

The following aspects are illustrative only and aspects thereof may be combined with aspects of other embodiments or teaching described herein, without limitation.

Aspect 1 is a method for wireless communication at a node including identifying an aggressor node that transmits interfering signals that cause interference to signals received at the node, transmitting a configuration for applying a phase shift to the interfering signals for forwarding to the node from a reflecting node with the phase shift applied, and receiving, from the reflecting node, the interfering signals with the phase shift applied to at least partially cancel the interference to the signals received at the node.

In Aspect 2, the method of Aspect 1 includes where identifying the aggressor node includes at least one of identifying prior measurements of signals received from the aggressor node, detecting an identity of the aggressor node from the interfering signals, or receiving an identity of the aggressor node.

In Aspect 3, the method of any of Aspects 1 or 2 includes where transmitting the configuration includes transmitting the configuration to indicate one or more properties of the interfering signals.

In Aspect 4, the method of any of Aspects 1 to 3 includes where transmitting the configuration includes at least one of transmitting the configuration to the reflecting node, transmitting the configuration to a control node that controls the reflecting node, or transmitting the configuration to the aggressor node.

In Aspect 5, the method of any of Aspects 1 to 4 includes where the configuration indicates a reflecting direction for the reflecting node to use in transmitting the interfering signals with the phase shift applied.

In Aspect 6, the method of Aspect 5 includes determining the reflecting direction based on a spatial direction between the node and the reflecting node.

In Aspect 7, the method of Aspect 5 includes determining the reflecting direction at least in part by performing a beam training procedure to determine a beam transmitted by the reflecting node that has a highest signal measurement at the node.

In Aspect 8, the method of any of Aspects 1 to 7 includes performing a receive beam training procedure with the reflecting node at least in part by transmitting, to the reflecting node, signal measurements, wherein the signal measurements correspond to receiving the interfering signals along with the interfering signals with the phase shift applied from the reflecting node based on multiple receive beam directions at the reflecting node.

In Aspect 9, the method of any of Aspects 1 to 8 includes where the configuration indicates a phase shift value for the phase shift.

In Aspect 10, the method of any of Aspects 1 to 9 includes where transmitting the configuration includes transmitting the configuration to multiple reflecting nodes, including the reflecting node, to cause the multiple reflecting nodes to concurrently forward the interfering signals, with the phase shift applied, to the node.

In Aspect 11, the method of Aspect 10 includes selecting the multiple reflecting nodes for forwarding the interfering signals, with the phase shift applied, based on measurements of the interfering signals.

In Aspect 12, the method of any of Aspects 1 to 11 includes where the reflecting node is one of a reflecting surface or a repeater.

In Aspect 13, the method of any of Aspects 1 to 11 includes where the reflecting node is a repeater, and wherein the configuration indicates a transmit power for the repeater to use in transmitting the interfering signals with the phase shift applied.

In Aspect 14, the method of any of Aspects 1 to 11 includes where the reflecting node is a repeater, and wherein the configuration indicates a portion of bandwidth of the interfering signals.

In Aspect 15, the method of any of Aspects 1 to 11 includes where the reflecting node is a repeater, and wherein the configuration indicates a delay to apply in transmitting the interfering signals with the phase shift applied.

In Aspect 16, the method of any of Aspects 1 to 15 includes transmitting, to the aggressor node, a request to transmit the interfering signals towards the reflecting node with the phase shift applied.

Aspect 17 is a method for wireless communication at a reflecting node including receiving a configuration for applying a phase shift to interfering signals received from an aggressor node for forwarding to a node from a reflecting node with the phase shift applied, receiving, from the aggressor node, the interfering signals, applying, based on the configuration, the phase shift to the interfering signals, and transmitting, to the node, the interfering signals with the phase shift applied.

In Aspect 18, the method of Aspect 17 includes where receiving the configuration includes receiving the configuration from the node or receiving the configuration from a control node.

In Aspect 19, the method of any of Aspects 17 or 18 includes where the configuration indicates a reflecting direction to use in transmitting the interfering signals to the node, wherein transmitting the interfering signals with the phase shift applied is based on the reflecting direction.

In Aspect 20, the method of any of Aspects 17 to 19 includes performing a beam training procedure with the node to determine, based on signal measurements received from the node, a beam having a highest signal measurement, wherein transmitting the interfering signals with the phase shift applied is based on a reflecting direction corresponding to the beam.

In Aspect 21, the method of any of Aspects 17 to 20 includes determining a reflecting direction to use in receiving the interfering signals from the aggressor node, wherein receiving the interfering signals is based on the reflecting direction.

In Aspect 22, the method of Aspect 21 includes where determining the reflecting direction is based on a spatial direction between the reflecting node and the aggressor node.

In Aspect 23, the method of Aspect 21 includes where determining the reflecting direction is based on a configuration received from a control node.

In Aspect 24, the method of Aspect 21 includes performing a beam training procedure with the node to determine, based on interfering signal measurements received from the node, a receive beam having a lowest interfering signal measurement, wherein the interfering signal measurements correspond to receiving, at the node, the interfering signals along with the interfering signals with the phase shift applied from the reflecting node based on multiple receive beam directions at the reflecting node, and wherein determining the reflecting direction is based on the receive beam.

In Aspect 25, the method of any of Aspects 17 to 24 includes where the configuration indicates a value for the phase shift, and wherein applying the phase shift is based on the value for the phase shift.

In Aspect 26, the method of any of Aspects 17 to 25 includes where the configuration indicates multiple values for the phase shift, and wherein applying the phase shift includes selecting one of the multiple values for the phase shift.

In Aspect 27, the method of any of Aspects 17 to 26 includes where the reflecting node is one of a reflecting surface or a repeater.

In Aspect 28, the method of any of Aspects 17 to 26 includes where the reflecting node is a repeater, wherein the configuration indicates a transmit power for the repeater to use in transmitting the interfering signals with the phase shift applied, and wherein transmitting the interfering signals with the phase shift applied includes transmitting using the transmit power.

In Aspect 29, the method of any of Aspects 17 to 26 includes where the reflecting node is a repeater, wherein the configuration indicates a portion of bandwidth of the interfering signals, and wherein transmitting the interfering signals with the phase shift applied includes transmitting only the portion of bandwidth of the interfering signals.

In Aspect 30, the method of any of Aspects 17 to 26 includes where the reflecting node is a repeater, wherein the configuration indicates a delay to apply in transmitting the interfering signals with the phase shift applied, and wherein transmitting the interfering signals with the phase shift applied includes transmitting the interfering signals based on the delay.

Aspect 31 is a method for wireless communication at a control node including receiving, from a node, an indication of an aggressor node that transmits interfering signals that cause interference to signals received at the node, generating a configuration for applying a phase shift to the interfering signals from the aggressor node for forwarding to the node from a reflecting node with the phase shift applied, and transmitting, to the reflecting node or the aggressor node, the configuration.

In Aspect 32, the method of Aspect 31 includes where the configuration indicates a reflecting direction for the reflecting node to use in transmitting the interfering signals, having the phase shift applied, to the node.

In Aspect 33, the method of Aspect 31 includes where the configuration indicates a reflecting direction for the reflecting node to use in receiving the interfering signals from the aggressor node.

In Aspect 34, the method of Aspect 33 includes determining the reflecting direction based on a spatial direction between the reflecting node and the aggressor node.

Aspect 35 is a method for wireless communication at an aggressor node including receiving a configuration for applying a phase shift to interfering signals transmitted from the aggressor node for forwarding to a node from a reflecting node with the phase shift applied, transmitting the interfering signals toward the node, and transmitting the interfering signals with the phase shift applied toward the reflecting node.

In Aspect 36, the method of Aspect 35 includes where transmitting the interfering signals is based on a first beam, and wherein transmitting the interfering signals with phase shift applied is based on a second beam that is different than the first beam.

Aspect 37 is an apparatus for wireless communication including a transceiver, a memory configured to store instructions, and one or more processors communicatively coupled with the transceiver and the memory, where the one or more processors are configured to execute the instructions to perform the operations of one or more methods in any of Aspects 1 to 36.

Aspect 38 is an apparatus for wireless communication including means for performing the operations of one or more methods in any of Aspects 1 to 36.

Aspect 39 is a computer-readable medium including code executable by one or more processors to perform the operations of one or more methods in any of Aspects 1 to 36.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a transceiver;
a memory configured to store instructions; and
one or more processors communicatively coupled with the memory and the transceiver, wherein the one or more processors are configured to execute the instructions to cause the apparatus to:
identify an aggressor node that transmits interfering signals that cause interference to signals received at the node;
transmit a configuration for applying a phase shift to the interfering signals for forwarding to the node from a reflecting node with the phase shift applied; and
receive, from the reflecting node, the interfering signals with the phase shift applied to at least partially cancel the interference to the signals received at the node.

2. The apparatus of claim 1, wherein the one or more processors are configured to execute the instructions to cause the apparatus to identify the aggressor node at least in part by at least one of identifying prior measurements of signals received from the aggressor node, detecting an identity of the aggressor node from the interfering signals, or receiving an identity of the aggressor node.

3. The apparatus of claim 1, wherein the one or more processors are configured to execute the instructions to cause the apparatus to transmit the configuration to indicate one or more properties of the interfering signals.

4. The apparatus of claim 1, wherein the one or more processors are configured to execute the instructions to cause the apparatus to transmit the configuration including at least one of transmitting the configuration to the reflecting node, transmitting the configuration to a control node that controls the reflecting node, or transmitting the configuration to the aggressor node.

5. The apparatus of claim 1, wherein the configuration indicates a reflecting direction for the reflecting node to use in transmitting the interfering signals with the phase shift applied.

6. The apparatus of claim 5, wherein the one or more processors are further configured to execute the instructions to cause the apparatus to determine the reflecting direction based on a spatial direction between the node and the reflecting node.

7. The apparatus of claim 5, wherein the one or more processors are further configured to execute the instructions to cause the apparatus to determine the reflecting direction at least in part by performing a beam training procedure to determine a beam transmitted by the reflecting node that has a highest signal measurement at the node.

8. The apparatus of claim 1, wherein the one or more processors are further configured to execute the instructions to cause the apparatus to perform a receive beam training procedure with the reflecting node at least in part by transmitting, to the reflecting node, signal measurements, wherein the signal measurements correspond to receiving the interfering signals along with the interfering signals with the phase shift applied from the reflecting node based on multiple receive beam directions at the reflecting node.

9. The apparatus of claim 1, wherein the configuration indicates a phase shift value for the phase shift.

10. The apparatus of claim 1, wherein the one or more processors are configured to execute the instructions to cause the apparatus to transmit the configuration to multiple reflecting nodes, including the reflecting node, to cause the multiple reflecting nodes to concurrently forward the interfering signals, with the phase shift applied, to the node.

11. The apparatus of claim 10, wherein the one or more processors are further configured to execute the instructions to cause the apparatus to select the multiple reflecting nodes for forwarding the interfering signals, with the phase shift applied, based on measurements of the interfering signals.

12. The apparatus of claim 1, wherein the reflecting node is one of a reflecting surface or a repeater.

13. The apparatus of claim 1, wherein the reflecting node is a repeater, and wherein the configuration indicates a transmit power for the repeater to use in transmitting the interfering signals with the phase shift applied.

14. The apparatus of claim 1, wherein the reflecting node is a repeater, and wherein the configuration indicates a portion of bandwidth of the interfering signals.

15. The apparatus of claim 1, wherein the reflecting node is a repeater, and wherein the configuration indicates a delay to apply in transmitting the interfering signals with the phase shift applied.

16. The apparatus of claim 1, wherein the one or more processors are further configured to execute the instructions to cause the apparatus to transmit, to the aggressor node, a request to transmit the interfering signals towards the reflecting node with the phase shift applied.

17. An apparatus for wireless communication, comprising:
a transceiver;
a memory configured to store instructions; and
one or more processors communicatively coupled with the memory and the transceiver, wherein the one or more processors are configured to execute the instructions to cause the apparatus to:
receive a configuration for applying a phase shift to interfering signals received from an aggressor node for forwarding to a node from a reflecting node with the phase shift applied;
receive, from the aggressor node, the interfering signals;
apply, based on the configuration, the phase shift to the interfering signals; and transmit, to the node, the interfering signals with the phase shift applied.

18. The apparatus of claim 17, wherein the one or more processors are configured to execute the instructions to cause the apparatus to receive the configuration from the node or from a control node.

19. The apparatus of claim 17, wherein the configuration indicates a reflecting direction to use in transmitting the interfering signals to the node, the one or more processors are configured to execute the instructions to cause the apparatus to transmit the interfering signals with the phase shift applied based on the reflecting direction.

20. The apparatus of claim 17, wherein the one or more processors are further configured to execute the instructions to cause the apparatus to perform a beam training procedure with the node to determine, based on signal measurements received from the node, a beam having a highest signal measurement, wherein the one or more processors are configured to execute the instructions to cause the apparatus to transmit the interfering signals with the phase shift applied based on a reflecting direction corresponding to the beam.

21. The apparatus of claim 17, wherein the one or more processors are further configured to execute the instructions to cause the apparatus to determine a reflecting direction to use in receiving the interfering signals from the aggressor node, wherein the one or more processors are configured to execute the instructions to cause the apparatus to receive the interfering signals based on the reflecting direction.

22. The apparatus of claim 21, wherein the one or more processors are configured to execute the instructions to cause the apparatus to determine the reflecting direction based on a spatial direction between the reflecting node and the aggressor node.

23. The apparatus of claim 21, wherein the one or more processors are configured to execute the instructions to cause the apparatus to determine the reflecting direction based on a configuration received from a control node.

24. The apparatus of claim 21, wherein the one or more processors are further configured to execute the instructions to cause the apparatus to perform a beam training procedure with the node to determine, based on interfering signal measurements received from the node, a receive beam having a lowest interfering signal measurement, wherein the interfering signal measurements correspond to receiving, at the node, the interfering signals along with the interfering signals with the phase shift applied from the reflecting node based on multiple receive beam directions at the reflecting node, and wherein the one or more processors are configured to execute the instructions to cause the apparatus to determine the reflecting direction based on the receive beam.

25. The apparatus of claim 17, wherein the configuration indicates a value for the phase shift, and wherein the one or more processors are configured to execute the instructions to cause the apparatus to apply the phase shift based on the value for the phase shift.

26. The apparatus of claim 17, wherein the configuration indicates multiple values for the phase shift, and wherein the one or more processors are configured to execute the instructions to cause the apparatus to apply the phase shift including selecting one of the multiple values for the phase shift.

27. A method for wireless communication by an intended receiving node, comprising:
identifying an aggressor node that transmits interfering signals that cause interference to signals received at the node;
transmitting a configuration for applying a phase shift to the interfering signals for forwarding to the node from a reflecting node with the phase shift applied; and
receiving, from the reflecting node, the interfering signals with the phase shift applied to at least partially cancel the interference to the signals received at the node.

28. The method of claim 27, wherein identifying the aggressor node includes at least one of identifying prior measurements of signals received from the aggressor node, detecting an identity of the aggressor node from the interfering signals, or receiving an identity of the aggressor node.

29. The method of claim 28, wherein receiving the configuration includes the configuration from the node or from a control node.

30. A method for wireless communication by a reflecting node, comprising:
receiving a configuration for applying a phase shift to interfering signals received from an aggressor node for forwarding to a node from a reflecting node with the phase shift applied;
receiving, from the aggressor node, the interfering signals;
applying, based on the configuration, the phase shift to the interfering signals; and
transmitting, to the node, the interfering signals with the phase shift applied.

\* \* \* \* \*